(12) United States Patent
Mori

(10) Patent No.: US 11,381,733 B2
(45) Date of Patent: Jul. 5, 2022

(54) INFORMATION PROCESSING APPARATUS, IMAGE CAPTURING SYSTEM, METHOD OF CONTROLLING IMAGE CAPTURING SYSTEM, AND NON-TRANSITORY STORAGE MEDIUM

(71) Applicant: CANON KABUSHIKI KAISHA, Tokyo (JP)

(72) Inventor: Shigeki Mori, Koshigaya (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 16/781,613

(22) Filed: Feb. 4, 2020

(65) Prior Publication Data

US 2020/0236294 A1  Jul. 23, 2020

Related U.S. Application Data

(63) Continuation of application No. PCT/JP2018/027883, filed on Jul. 25, 2018.

(30) Foreign Application Priority Data

Aug. 7, 2017  (JP) .............................. JP2017-152574

(51) Int. Cl.
*H04N 5/232* (2006.01)
*H04N 5/225* (2006.01)
*G03B 13/36* (2021.01)

(52) U.S. Cl.
CPC ....... *H04N 5/232133* (2018.08); *G03B 13/36* (2013.01); *H04N 5/2253* (2013.01); *H04N 5/23299* (2018.08); *H04N 5/232127* (2018.08)

(58) Field of Classification Search
CPC ....... H04N 5/232133; H04N 5/232127; H04N 5/23299; H04N 5/2253; H04N 5/232;
(Continued)

(56) References Cited

U.S. PATENT DOCUMENTS 6,389,179 B1   5/2002  Katayama
9,704,250 B1 *  7/2017  Shah ........................ H04N 9/07
(Continued)

FOREIGN PATENT DOCUMENTS

CN          1977526 A  *  6/2007  ......... H04N 5/23212
CN       103888645 A        6/2014
(Continued)

*Primary Examiner* — Dramos Kalapodas
(74) *Attorney, Agent, or Firm* — Canon U.S.A., Inc. IP Division

(57) ABSTRACT

A camera platform apparatus (102) sequentially moves an image capturing direction of an image capturing apparatus (101) with respect to an object to be inspected. The image capturing apparatus (101) acquires a captured image of each section of the object by performing image capturing in each image capturing direction. A computational operation apparatus (103) records a focus control position for each section of the object whose image is captured by the image capturing apparatus (101) in each image capturing direction. In a case where AF is not successful when image capturing is performed on a section whose image is not yet captured, the computational operation apparatus (103) sets an allowable range of the focus control position for the section for which the AF is not successful based on the recorded focus control positions, and the computational operation apparatus (103) controls the image capturing apparatus (101) to perform focus BLK image capturing within the set range.

19 Claims, 19 Drawing Sheets

(58) Field of Classification Search
CPC ........ G03B 13/36; G03B 15/00; G03B 17/00; G03B 17/56; G03B 37/00; G02B 7/28; G02B 7/36
See application file for complete search history.

(56) References Cited

U.S. PATENT DOCUMENTS

| | | | |
|---|---|---|---|
| 10,365,090 B2* | 7/2019 | Watanabe | G01N 21/9515 |
| 10,739,274 B2* | 8/2020 | Nonaka | G06T 7/80 |
| 2002/0126890 A1* | 9/2002 | Katayama | H04N 5/23238 |
| | | | 382/284 |
| 2006/0170813 A1 | 8/2006 | Morofuji | |
| 2008/0165272 A1 | 7/2008 | Toguchi | |
| 2008/0192139 A1* | 8/2008 | Kanai | H04N 5/232123 |
| | | | 348/E5.045 |
| 2009/0225199 A1* | 9/2009 | Ferren | H04N 5/23222 |
| | | | 348/240.99 |
| 2014/0009572 A1* | 1/2014 | Matsumoto | H04N 5/23238 |
| | | | 348/36 |
| 2016/0323490 A1* | 11/2016 | Thumpudi | H04N 5/232 |
| 2018/0124326 A1* | 5/2018 | Irie | H04N 5/2257 |
| 2018/0347981 A1 | 12/2018 | Masuda | |
| 2020/0007771 A1* | 1/2020 | Mizusawa | H04N 5/232133 |

FOREIGN PATENT DOCUMENTS

| | | |
|---|---|---|
| GN | 1977526 A | 6/2007 |
| GN | 102135659 A | 7/2011 |
| GN | 103688530 A | 3/2014 |
| JP | 2004-126291 A | 4/2004 |
| JP | 2004-144957 A | 5/2004 |
| JP | 2006-215181 A | 8/2006 |
| JP | 2008172676 A | 7/2008 |
| JP | 2010032646 A | 2/2010 |
| JP | 2010107862 A | 5/2010 |
| JP | 2011-81186 A1 | 4/2011 |
| JP | 2012-42728 A | 3/2012 |
| JP | 2013-210572 A | 10/2013 |
| JP | 2013210572 A * | 10/2013 |
| WO | 2017/002512 A1 | 1/2017 |
| WO | 2017/149851 A1 | 9/2017 |

* cited by examiner

FIG. 11A

| IMAGE CAPTURING DIRECTION NUMBER | 1003 | 1004 | 1005 | 1006 | 1007 | 1008 | 1009 | 1010 | 1011 | 1012 | 1013 | 1014 | 1015 | 1016 | 1017 |
|---|---|---|---|---|---|---|---|---|---|---|---|---|---|---|---|
| SUCCESS OR FAILURE OF AF | ○ | ○ | ○ | × | | | | | | | | | | | |
| PREDICTED F CONTROL POSITION RANGE | | | | 20-24(5) | | | | | | | | | | | |
| FOCUS CONTROL POSITION | 19 | 21 | 22 | | | | | | | | | | | | |
| DISPLACEMENT OF F CONTROL POSITION | | 2 | 1 | | | | | | | | | | | | |

FIG. 11B

| IMAGE CAPTURING DIRECTION NUMBER | 1003 | 1004 | 1005 | 1006 | 1007 | 1008 | 1009 | 1010 | 1011 | 1012 | 1013 | 1014 | 1015 | 1016 | 1017 |
|---|---|---|---|---|---|---|---|---|---|---|---|---|---|---|---|
| SUCCESS OR FAILURE OF AF | ○ | ○ | ○ | × | ○ | | | | | | | | | | |
| PREDICTED F CONTROL POSITION RANGE | | | | 20-24(5) | | | | | | | | | | | |
| FOCUS CONTROL POSITION | 19 | 21 | 22 | 23 | 24 | | | | | | | | | | |
| DISPLACEMENT OF F CONTROL POSITION | | 2 | 1 | 1 | 1 | | | | | | | | | | |

FIG. 11C

| IMAGE CAPTURING DIRECTION NUMBER | 1003 | 1004 | 1005 | 1006 | 1007 | 1008 | 1009 | 1010 | 1011 | 1012 | 1013 | 1014 | 1015 | 1016 | 1017 |
|---|---|---|---|---|---|---|---|---|---|---|---|---|---|---|---|
| SUCCESS OR FAILURE OF AF | ○ | ○ | ○ | × | ○ | ○ | × | | | | | | | | |
| PREDICTED F CONTROL POSITION RANGE | | | | 20-24(5) | | | 23-25(3) | | | | | | | | |
| FOCUS CONTROL POSITION | 19 | 21 | 22 | 23 | 24 | 24 | | | | | | | | | |
| DISPLACEMENT OF F CONTROL POSITION | | 2 | 1 | 1 | 1 | 0 | | | | | | | | | |

FIG. 11D

| IMAGE CAPTURING DIRECTION NUMBER | 1003 | 1004 | 1005 | 1006 | 1007 | 1008 | 1009 | 1010 | 1011 | 1012 | 1013 | 1014 | 1015 | 1016 | 1017 |
|---|---|---|---|---|---|---|---|---|---|---|---|---|---|---|---|
| SUCCESS OR FAILURE OF AF | O | O | O | × | O | O | × | O | | | | | | | |
| PREDICTED F CONTROL POSITION RANGE | | | | 20-24(5) | | | 23-25(3) | | | | | | | | |
| FOCUS CONTROL POSITION | 19 | 21 | 22 | 23 | 24 | 24 | 24 | | | | | | | | |
| DISPLACEMENT OF F CONTROL POSITION | | 2 | 1 | 1 | 1 | 0 | 0 | 0 | | | | | | | |

FIG. 11E

| IMAGE CAPTURING DIRECTION NUMBER | 1003 | 1004 | 1005 | 1006 | 1007 | 1008 | 1009 | 1010 | 1011 | 1012 | 1013 | 1014 | 1015 | 1016 | 1017 |
|---|---|---|---|---|---|---|---|---|---|---|---|---|---|---|---|
| SUCCESS OR FAILURE OF AF | O | O | O | × | O | O | × | O | O | × | | | | | |
| PREDICTED F CONTROL POSITION RANGE | | | | 20-24(5) | | | 23-25(3) | | | 23-25(3) | | | | | |
| FOCUS CONTROL POSITION | 19 | 21 | 22 | 23 | 24 | 24 | 24 | 24 | 24 | | | | | | |
| DISPLACEMENT OF F CONTROL POSITION | | 2 | 1 | 1 | 1 | 0 | 0 | 0 | 0 | | | | | | |

FIG. 11F

| IMAGE CAPTURING DIRECTION NUMBER | 1003 | 1004 | 1005 | 1006 | 1007 | 1008 | 1009 | 1010 | 1011 | 1012 | 1013 | 1014 | 1015 | 1016 | 1017 |
|---|---|---|---|---|---|---|---|---|---|---|---|---|---|---|---|
| SUCCESS OR FAILURE OF AF | ○ | ○ | ○ | × | ○ | ○ | × | ○ | ○ | × | ○ | ○ | × | | |
| PREDICTED F CONTROL POSITION RANGE | | | | 20-24(5) | | | 23-25(3) | | | 23-25(3) | | | 21-19(3) | | |
| FOCUS CONTROL POSITION | 19 | 21 | 22 | 23 | 24 | 24 | 24 | 24 | 24 | 23 | 22 | 21 | | | |
| DISPLACEMENT OF F CONTROL POSITION | | 2 | 1 | 1 | 1 | 0 | 0 | 0 | 0 | -1 | -1 | -1 | | | |

FIG. 11G

| IMAGE CAPTURING DIRECTION NUMBER | 1003 | 1004 | 1005 | 1006 | 1007 | 1008 | 1009 | 1010 | 1011 | 1012 | 1013 | 1014 | 1015 | 1016 | 1017 |
|---|---|---|---|---|---|---|---|---|---|---|---|---|---|---|---|
| SUCCESS OR FAILURE OF AF | ○ | ○ | ○ | × | ○ | ○ | × | ○ | ○ | × | ○ | ○ | × | ○ | ○ |
| PREDICTED F CONTROL POSITION RANGE | | | | 20-24(5) | | | 23-25(3) | | | 23-25(3) | | | 21-19(3) | | |
| FOCUS CONTROL POSITION | 19 | 21 | 22 | 23 | 24 | 24 | 24 | 24 | 24 | 23 | 22 | 21 | 20 | 18 | 15 |
| DISPLACEMENT OF F CONTROL POSITION | | 2 | 1 | 1 | 1 | 0 | 0 | 0 | 0 | -1 | -1 | -1 | -1 | -2 | -3 |

FIG. 16A

| | 1503 | 1504 | 1505 | 1506 | 1507 | 1508 | 1509 | 1510 | 1511 | 1512 | 1513 | 1514 | 1515 | 1516 | 1517 |
|---|---|---|---|---|---|---|---|---|---|---|---|---|---|---|---|
| IMAGE CAPTURING DIRECTION NUMBER | | | | | | | | | | | | | | | |
| SUCCESS OR FAILURE OF AF | ○ | | | | | | | | | | | | | | |
| PREDICTED F CONTROL POSITION RANGE | | 14-24 | | | | | | | | | | | | | |
| FOCUS CONTROL POSITION | 19 | 21 | | | | | | | | | | | | | |
| JUDGMENT OF VALIDITY OF F CONTROL POSITION | − | ○ | | | | | | | | | | | | | |
| DISPLACEMENT OF F CONTROL POSITION | − | 2 | | | | | | | | | | | | | |

FIG. 16B

| | 1503 | 1504 | 1505 | 1506 | 1507 | 1508 | 1509 | 1510 | 1511 | 1512 | 1513 | 1514 | 1515 | 1516 | 1517 |
|---|---|---|---|---|---|---|---|---|---|---|---|---|---|---|---|
| IMAGE CAPTURING DIRECTION NUMBER | | | | | | | | | | | | | | | |
| SUCCESS OR FAILURE OF AF | ○ | | ○ | ○ | ○ | ○ | ○ | ○ | | | | | | | |
| PREDICTED F CONTROL POSITION RANGE | | 14-24 | 21-24 | 20-24 | 21-25 | 22-26 | 23-25 | 23-25 | | | | | | | |
| FOCUS CONTROL POSITION | 19 | 21 | 22 | 23 | 24 | 24 | 24 | 20 | | | | | | | |
| JUDGMENT OF VALIDITY OF F CONTROL POSITION | − | ○ | ○ | ○ | ○ | ○ | ○ | × | | | | | | | |
| DISPLACEMENT OF F CONTROL POSITION | − | 2 | 1 | 1 | 1 | 0 | 0 | −4 | | | | | | | |

FIG. 16C

| | 1503 | 1504 | 1505 | 1506 | 1507 | 1508 | 1509 | 1510 | 1511 | 1512 | 1513 | 1514 | 1515 | 1516 | 1517 |
|---|---|---|---|---|---|---|---|---|---|---|---|---|---|---|---|
| IMAGE CAPTURING DIRECTION NUMBER | | | | | | | | | | | | | | | |
| SUCCESS OR FAILURE OF AF | ○ | | ○ | ○ | ○ | ○ | ○ | ○ | ○ | | | | | | |
| PREDICTED F CONTROL POSITION RANGE | | 14-24 | 21-24 | 20-24 | 21-25 | 22-26 | 23-25 | 23-25 | | | | | | | |
| FOCUS CONTROL POSITION | 19 | 21 | 22 | 23 | 24 | 24 | 24 | 20→(24) | 24 | | | | | | |
| JUDGMENT OF VALIDITY OF F CONTROL POSITION | − | ○ | ○ | ○ | ○ | ○ | ○ | ○ | | | | | | | |
| DISPLACEMENT OF F CONTROL POSITION | − | 2 | 1 | 1 | 1 | 0 | 0 | −4→(0) | | | | | | | |

×(BLK IMAGE CAPTURING)

FIG. 16D

| IMAGE CAPTURING DIRECTION NUMBER | 1503 | 1504 | 1505 | 1506 | 1507 | 1508 | 1509 | 1510 | 1511 | 1512 | 1513 | 1514 | 1515 | 1516 | 1517 |
|---|---|---|---|---|---|---|---|---|---|---|---|---|---|---|---|
| SUCCESS OR FAILURE OF AF | ○ | ○ | ○ | ○ | ○ | ○ | ○ | ○ | ○ | | | | | | |
| PREDICTED F CONTROL POSITION RANGE | | 14-24 | 21-24 | 20-24 | 21-25 | 22-26 | 23-25 | 23-25 | 23-25 | | | | | | |
| FOCUS CONTROL POSITION | 19 | 21 | 22 | 23 | 24 | 24 | 24 | 24 | 24 | | | | | | |
| JUDGMENT OF VALIDITY OF F CONTROL POSITION | − | ○ | ○ | ○ | ○ | ○ | ○ | ○ | ○ | | | | | | |
| DISPLACEMENT OF F CONTROL POSITION | | 2 | 1 | 1 | 1 | 0 | 0 | 0 | 0 | | | | | | |

× (BLK IMAGE CAPTURING)

FIG. 16E

| IMAGE CAPTURING DIRECTION NUMBER | 1503 | 1504 | 1505 | 1506 | 1507 | 1508 | 1509 | 1510 | 1511 | 1512 | 1513 | 1514 | 1515 | 1516 | 1517 |
|---|---|---|---|---|---|---|---|---|---|---|---|---|---|---|---|
| SUCCESS OR FAILURE OF AF | ○ | ○ | ○ | ○ | ○ | ○ | ○ | ○ | ○ | ○ | ○ | ○ | ○ | ○ | ○ |
| PREDICTED F CONTROL POSITION RANGE | | 14-24 | 21-24 | 20-24 | 21-25 | 22-26 | 23-25 | 23-25 | 23-25 | 23-25 | 20-23 | 20-22 | 19-21 | 18-20 | 15-18 |
| FOCUS CONTROL POSITION | 19 | 21 | 22 | 23 | 24 | 24 | 24 | 24 | 24 | 23 | 22 | 21 | 20 | 18 | 15 |
| JUDGMENT OF VALIDITY OF F CONTROL POSITION | − | ○ | ○ | ○ | ○ | ○ | ○ | ○ | ○ | ○ | ○ | ○ | ○ | ○ | ○ |
| DISPLACEMENT OF F CONTROL POSITION | | 2 | 1 | 1 | 1 | 0 | 0 | 0 | 0 | −1 | −1 | −1 | −1 | −2 | −3 |

× (BLK IMAGE CAPTURING)

INFORMATION PROCESSING APPARATUS, IMAGE CAPTURING SYSTEM, METHOD OF CONTROLLING IMAGE CAPTURING SYSTEM, AND NON-TRANSITORY STORAGE MEDIUM

CROSS-REFERENCE TO RELATED APPLICATIONS

This application is a Continuation of International Patent Application No. PCT/JP2018/027883, filed Jul. 25, 2018, which claims the benefit of Japanese Patent Application No. 2017-152574, filed Aug. 7, 2017, both of which are hereby incorporated by reference herein in their entirety.

TECHNICAL FIELD

The present invention relates to a technique for acquiring a high-definition image used for checking minute defect in a building structure or the like.

BACKGROUND ART

For example, as part of an inspection of buildings, dams, building structures of various infrastructure facilities, etc., to grasp existence or history of occurrences of defect such as cracks, rust, and/or the like, high-definition images are captured and analysis is performed using the captured images. It is necessary to detect existence of a minute defect even on the order of millimeters on a wall surface. Therefore, the wall surface is divided into small sections and a high-definition image is captured for each section. To capture an image of each of the sections over the entire wall surface without omission, it is necessary to perform an image capturing operation a huge number of times. To accomplish this, an imaging system is configured by combining a camera platform apparatus and an image capturing apparatus so as to be capable of automatically perform panning and tilting. The camera platform apparatus moves the image capturing apparatus until the image capturing direction of the image capturing apparatus is reached to a direction in which an image a next target section is captured. When this direction is reached, the camera platform apparatus automatically stops. This operation of moving and then stopping performed repeatedly. Each time the camera platform apparatus stops, the image capturing apparatus captures an image. In order to obtain high definition in the captured images, it is required to perform accurate focusing such that the entire region of each section is within the depth of field. To satisfy this requirement, when the image capturing apparatus captures an image, the image capturing apparatus uses an autofocus function (hereinafter referred to as AF) in which a point near the center of a screen is set as a distance measurement point. In the image capturing system, the driving and stopping of the camera platform apparatus and the AF focusing and the image capturing by the image capturing apparatus are repeated until the image capturing is completed for each of all sections with no omission over the entire wall surface.

However, in actual image capturing, there is a possibility, which is not high, that AF focusing fails due to various factors, such as an extreme low contrast at a wall surface, an existence of repetitive pattern, or the like. In a case where AF focusing fails, the image capturing system uses a predetermined function to perform image capturing at the same focus position as that used in capturing an image of a previous section or at a predetermined focus position. In some cases, the image capturing system operates such that the automatic driving of the camera platform apparatus and the automatic image capturing by the image capturing apparatus are temporarily stopped, and the image capturing apparatus is operated by an operator to perform focusing. Thereafter, the image capturing operation is restarted. In addition, the following techniques are also disclosed for assisting in focusing based on control information given to the camera platform apparatus. For example, Japanese Patent Laid-Open No. 2012-42728 discloses a technique in which when a panning/tilting operation is performed, a new focus position is predicted from a previous focus position by a calculation based on control information given to the camera platform apparatus, and the focus driving is performed based on the prediction. Japanese Patent Laid-Open No. 2011-81186 discloses a technique in which when a panning/tilting operation is performed on a new object, the amount of panning/tilting movement of the camera platform apparatus is detected, and a determination is made as to a direction of focus driving on the new object.

However, a problem described below may occur when image capturing is performed at a focus position employed for a previous section or at a predetermined focus position. For example, depending on an angle between a target object section and the image capturing apparatus, a great change may occur in the distance to the target section, which may cause a captured image to have large defocus unacceptable for use in inspection. In such a case, it is necessary to again perform the image capturing only for this section. Furthermore, in a case where an operator performs focusing, automatic image capturing is interrupted each time the operator performs focusing. In addition, in this case, there is a problem that the operator has to stay near the image capturing apparatus even for a long time until the image capturing is completed. In the case of the technique disclosed in Japanese Patent Laid-Open No. 2012-42728, focus driving is performed based on a calculated prediction result, and thus an in-focus condition after panning/tilting is not guaranteed. The technique disclosed in Japanese Patent Laid-Open No. 2011-81186 is a technique for preventing focus fluctuation in a contrast AF operation by calculating the focus drive direction after panning/tilting. Therefore, in a case where AF does not work, focusing is not achieved.

SUMMARY OF INVENTION

In an aspect, a technique is provided to continue an image capturing operation even in a situation in which AF does not work normally without making it necessary to again perform image capturing due to a failure in focusing.

There is provided control means configured to control image capturing means, the image capturing means being configured to acquire captured images such that an image capturing direction is sequentially moved with respect to an object given as an image capturing target so as to cover the entire object given as an image capturing target and image capturing is performed in each of moved image capturing directions thereby acquiring an image of each section of the object, the control means configured to control the image capturing means so as to perform an operation, the operation comprising recording a focus control position for each of the sections of the object whose images are captured by the image capturing means in the respective image capturing directions, in a case where in capturing of an image of a section whose image is not yet captured, a focusing operation by an autofocus function of the image capturing means is not successful, setting an allowable range of the focus control position for the section whose image is not yet captured based on the recorded focus control positions, and performing focus bracketing image capturing on the section whose image is not yet captured such that a plurality of images of the section are captured while changing the focus control position based on the set range.

Further features of the present invention will become apparent from the following description of exemplary embodiments with reference to the attached drawings.

BRIEF DESCRIPTION OF DRAWINGS

FIG. 11A is a diagram for use in explaining a focus control position calculation according to the first embodiment.

FIG. 11B is a diagram for use in explaining a focus control position calculation according to the first embodiment.

FIG. 11C is a diagram for use in explaining a focus control position calculation according to the first embodiment.

FIG. 11D is a diagram for use in explaining a focus control position calculation according to the first embodiment.

FIG. 11E is a diagram for use in explaining a focus control position calculation according to the first embodiment.

FIG. 11F is a diagram for use in explaining a focus control position calculation according to the first embodiment.

FIG. 11G is a diagram for use in explaining a focus control position calculation according to the first embodiment.

FIG. 16A is a diagram for use in explaining a focus control position calculation according to the second embodiment.

FIG. 16B is a diagram for use in explaining a focus control position calculation according to the second embodiment.

FIG. 16C is a diagram for use in explaining a focus control position calculation according to the second embodiment.

FIG. 16D is a diagram for use in explaining a focus control position calculation according to the second embodiment.

FIG. 16E is a diagram for use in explaining a focus control position calculation according to the second embodiment.

DESCRIPTION OF EMBODIMENTS

Preferred embodiments of the present invention are described in detail below with reference to the accompanying drawings. Note that configurations shown in the following embodiments are given only by way of example and not for limiting the scope of the present invention.

First Embodiment

Figure 1:
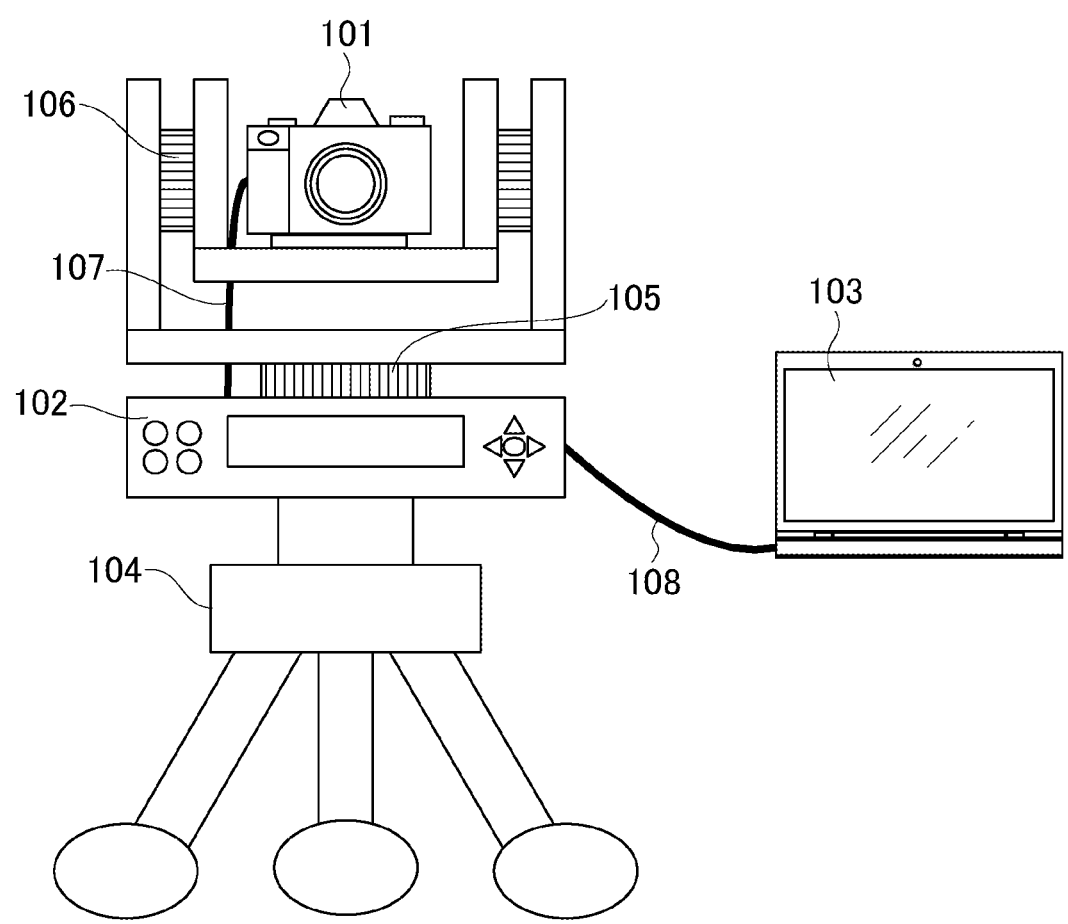
FIG. 1 is a schematic diagram of an image capturing system.

FIG. 1 is a schematic diagram of an image capturing system, which is an example of an image capturing apparatus, according to a first embodiment.

The image capturing system shown in FIG. 1 includes an image capturing apparatus 101, a camera platform apparatus 102, a tripod 104, and a computational operation apparatus 103. In the present embodiment, the image capturing system is configured to capture a high-definition image for checking minute defect in a wall surface or the like of a building structure or the like in checking an infrastructure facility such as a building, a dam, or the like.

The image capturing apparatus 101 is disposed on the camera platform apparatus 102, and the camera platform apparatus 102 is disposed on the tripod 104. The cameral platform apparatus 102 is an electric cameral platform apparatus including a pan drive unit 105 capable of performing rotary driving in a panning direction, and a tilt drive unit 106 capable of performing rotary driving in a tilting direction. The camera platform apparatus 102 and the image capturing apparatus 101 are connected to each other via a communication cable 107, and the camera platform apparatus 102 and the calculation apparatus 103 are connected to each other via a communication cable 108. The image capturing apparatus 101 and the computational operation apparatus 103 are connected to each other via the communication cable 107, the camera platform apparatus 102, and the communication cable 108. The computational operation apparatus 103 functions as an information processing apparatus according to the present embodiment. The computational operation apparatus 103 is capable of controlling at least focus bracketing image capturing performed by the image capturing apparatus 101 and performs a calculation related to a focus bracketing image capturing in the image capturing apparatus 101. Hereinafter, focus bracketing is denoted as focus BLK. The focus BLK is a function that automatically captures a plurality of images while changing the focus position in the focus direction in the image capturing apparatus 101.

Figure 2:
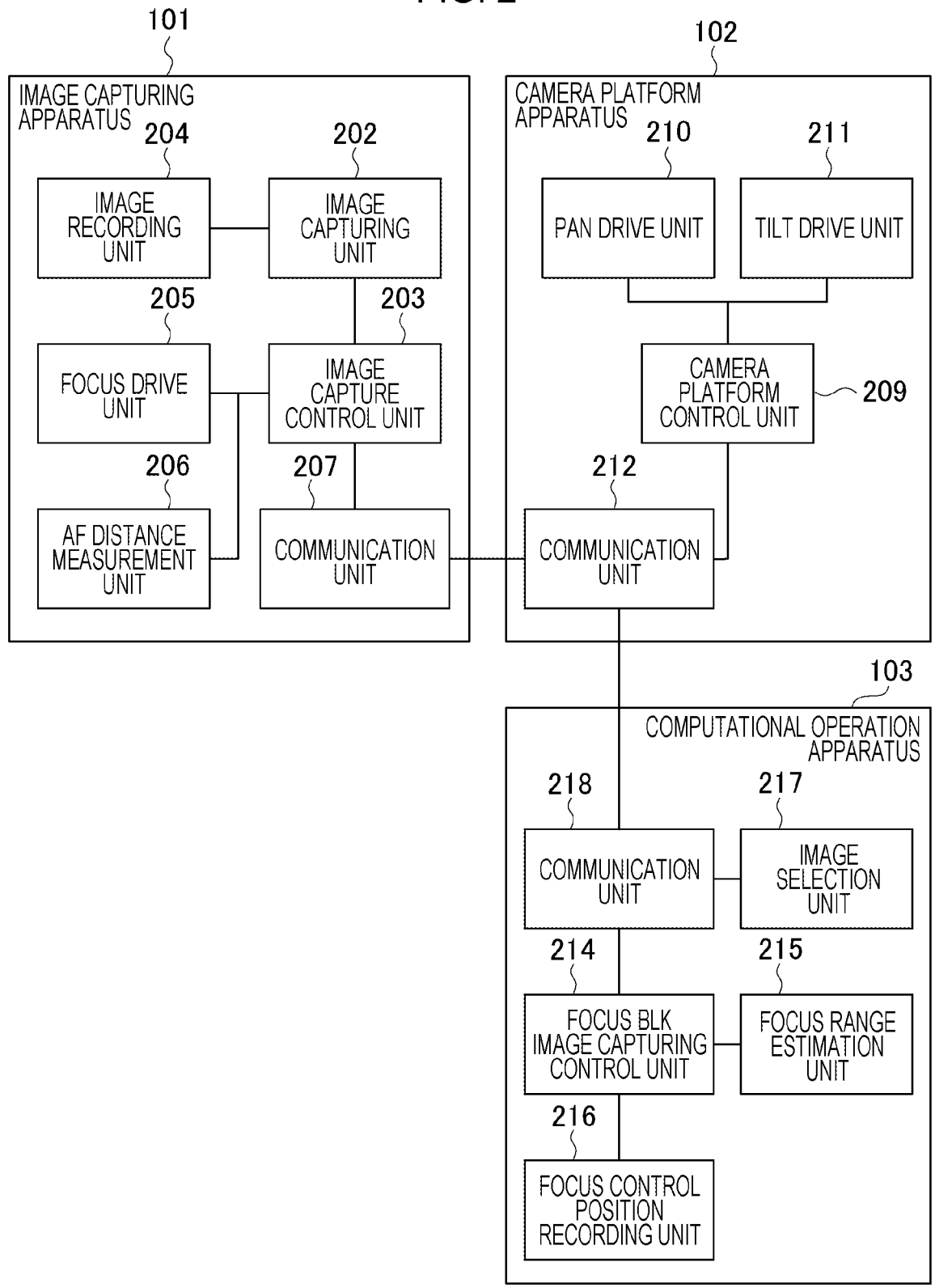
FIG. 2 is a functional block diagram of an image capturing system.

FIG. 2 is a diagram schematically illustrating functional blocks of the image capturing system according to the first embodiment.

In FIG. 2, an image capturing unit 202 of the image capturing apparatus 101 captures an image. An image capture control unit 203 controls the entire image capturing apparatus 101. An image recording unit 204 records an image captured by the image capturing unit 202. A focus drive unit 205 drives a focus of an optical lens unit (not shown) attached to the image capturing apparatus 101. The optical lens unit may be an interchangeable lens unit attachable/detachable to/from the image capturing apparatus 101, or may be a lens unit fixed to the image capturing apparatus 101. An AF distance measurement unit 206 measures a distance from the image capturing apparatus 101 to an object to accomplish an autofocus function (hereinafter denoted as AF). A communication unit 207 performs communication between the camera platform apparatus 102 and the computational operation apparatus 103.

A camera platform control unit 209 of the camera platform apparatus 102 controls the entire camera platform apparatus 102. A pan drive unit 210 drives the pan drive unit 105 shown in FIG. 1. A tilt drive unit 211 drives the tilt drive unit 106 shown in FIG. 1. A communication unit 212 performs communication between the image capturing apparatus 101 and the computational operation apparatus 103.

A focus BLK image capturing control unit 214 of the computational operation apparatus 103 controls focus BLK image capturing performed by the image capturing apparatus 101. A focus range estimation unit 215 estimates (predicts) a control range in which a focus control position is to be changed during the focus BLK image capturing. A focus control position recording unit 216 records a focus control position employed in an image capturing operation by the image capturing apparatus 101 disposed on the camera platform apparatus 102. An image selection unit 217 selects a specific image from a plurality of images captured via the focus BLK image capturing and recorded in the image recording unit 204 in the image capturing apparatus 101. A communication unit 218 performs communication between the camera platform apparatus 102 and the image capturing apparatus 101. Details of operations and processes performed by respective functional blocks in the computational operation apparatus 103 will be described in detail later.

Figure 3A:
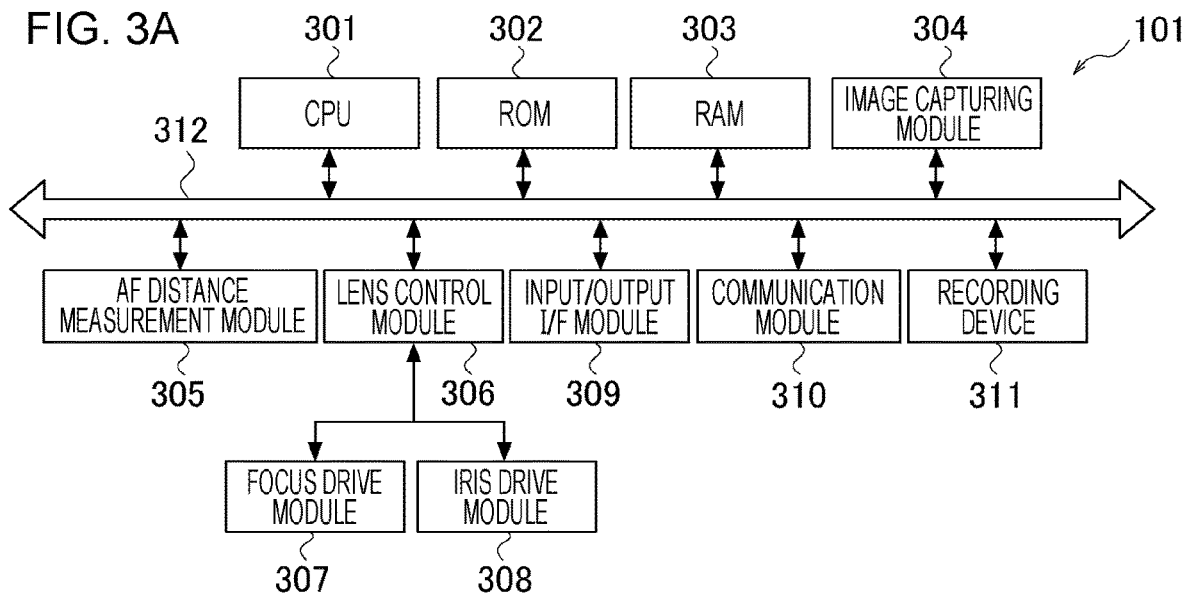
FIG. 3A is a block diagram illustrating an example of an internal configuration of each apparatus.
Figure 3B:
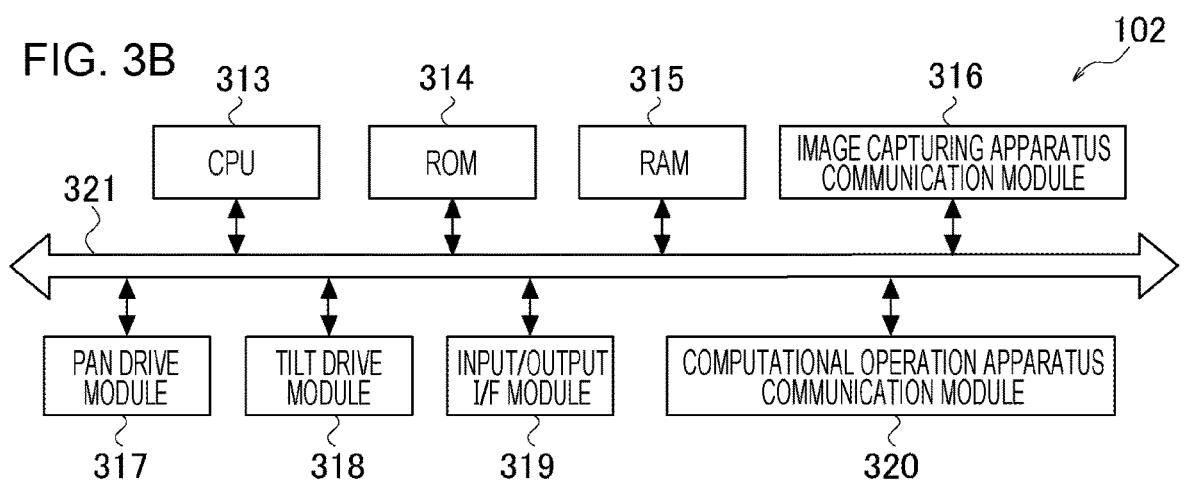
FIG. 3B is a block diagram illustrating an example of an internal configuration of each apparatus.
Figure 3C:
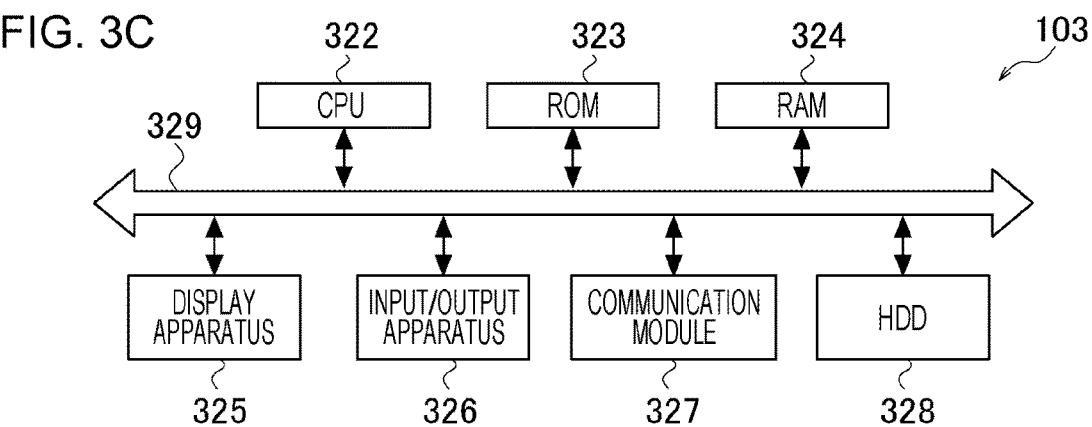
FIG. 3C is a block diagram illustrating an example of an internal configuration of each apparatus.

FIGS. 3A to 3C are diagrams illustrating internal configurations of the respective apparatuses in the image capturing system according to the first embodiment. FIG. 3A illustrates an example of an internal configuration of the image capturing apparatus 101, FIG. 3B illustrates an example of an internal configuration of the camera platform apparatus 102, and FIG. 3C illustrates an example of an internal configuration of the computational operation apparatus 103.

In the image capturing apparatus 101 shown in FIG. 3A, a CPU 301 is a central processing unit that controls the entire image capturing apparatus 101 according to the present embodiment. The CPU 301 realizes various functions of the image capturing apparatus 101 and various processes performed by the image capturing apparatus 101 by performing computational operations and processes on information and controlling respective units (including hardware units) in the image capturing apparatus 101 based on a control program related to the image capturing apparatus 101 according to the present embodiment.

A ROM 302 is a read-only memory that stores the control program related to the image capturing apparatus 101 and defining an operation process procedure to be performed by the CPU 301 according to the present embodiment. The ROM 302 includes a program ROM storing a system program functioning as basic software (OS) for controlling devices in the image capturing apparatus 101, and also includes a data ROM storing information used in operating the system. A RAM 303 is a random access memory, and functions as a main memory used by the CPU 301. The RAM 303 is used to load an execution program and also used as a work memory in executing the program.

An image capturing module 304 includes a image sensor, an A/D converter, etc. The image sensor receives object light incident through an optical lens unit (not shown) of the image capturing apparatus 101 and converts it into an captured-image signal. The A/D converter converts the captured-image signal output from the image sensor into image data. The image capturing module 304 writes the image data output from the A/D converter directly or indirectly into a recording device 311 that will be described later.

An AF distance measurement module 305 measures a distance to an object via the optical lens unit of the image capturing apparatus 101 and determines the focus control position. A lens control module 306 controls the optical lens unit. A focus drive module 307 drives the focus lens of the optical lens unit based on an instruction given from the lens control module 306. An iris drive module 308 drives a diaphragm (iris) included in the optical lens unit based on an instruction given from the lens control module 306.

An input/output I/F module 309 is an interface module for a user to perform inputting in terms of various settings such as image capturing settings to the image capturing apparatus 101. A communication module 310 performs communication when the image capturing apparatus 101 exchanges various kinds of information, control signals, and the like with the camera platform apparatus 102 and the computational operation apparatus 103. A recording device 311 records an image captured by the image capturing module 304 in a memory card or the like. An input/output bus 312 is a bus for connecting the above-described modules of the image capturing apparatus 101, and includes an address bus, a data bus, and a control bus.

In the camera platform apparatus 102 shown in FIG. 3B, a CPU 313 is a central processing unit that controls the whole camera platform apparatus 102. The CPU 313 executes control of each part (including hardware) in the camera platform apparatus 102 based on a control program related to the camera platform apparatus 102 according to the present embodiment thereby realizing each functional configuration in the camera platform apparatus 102 and processes performed by the camera platform apparatus 102 as described later.

A ROM 314 is a read-only memory that stores the control program related to the camera platform apparatus 102 and defining an operation process procedure performed by the CPU 313 according to the present embodiment. The ROM 314 includes a program ROM storing a system program functioning as basic software for controlling devices in the camera platform apparatus 102, and also includes a data ROM storing information used in operating the system. A RAM 315 is a random access memory, and functions as a main memory used by the CPU 313. The RAM 315 is used to load an execution program and also used as a work memory in executing the program.

A panning drive module 317 drives a pan drive unit 105 of the camera platform apparatus 102 shown in FIG. 1. A tilting drive module 318 drives a tilt drive unit 106 of the camera platform apparatus 102 shown in FIG. 1. An input/output I/F module 319 is an interface module for a user to perform various settings of the camera platform apparatus 102. An image capturing apparatus communication module 316 performs communication with the image capturing apparatus 101 in terms of various kinds of information and control signals. A computational operation apparatus communication module 320 performs communication with the computational operation apparatus 103 in terms of various kinds of information and control signals. An input/output bus 321 is a bus for connecting the above-described modules of the camera platform apparatus 102, and includes an address bus, a data bus, and a control bus.

In the computational operation apparatus 103 shown in FIG. 3C, a CPU 322 is a central processing unit that controls the whole computational operation apparatus 103. The CPU 322 executes control of each part (including hardware) in the computational operation apparatus 103 based on a control program related to the computational operation apparatus 103 according to the present embodiment thereby realizing each functional configuration in the computational operation apparatus 103 and processes performed by the computational operation apparatus 103 as described later.

A ROM 323 is a read-only memory that stores the control program related to the computational operation apparatus 103 and defining an operation process procedure performed by the CPU 322 according to the present embodiment. The ROM 323 includes a program ROM storing a system program functioning as basic software for controlling devices in the computational operation apparatus 103, and also includes a data ROM storing information used in operating the system. A RAM 324 is a random access memory, and functions as a main memory used by the CPU 322. The RAM 324 is used to load an execution program and also used as a work memory in executing the program.

A display apparatus 325 performs displaying for presenting various kinds of information in the computational operation apparatus 103 to a user. An input apparatus 326 is an apparatus for a user to input various kinds of information to the computational operation apparatus 103. A hard disk apparatus 328 is an HDD serving as an auxiliary storage apparatus. A communication module 327 performs communication when the computational operation apparatus 103 exchanges various kinds of information, control signals, and the like with the camera platform apparatus 102 and the image capturing apparatus 101. An input/output bus 329 is a bus for connecting the above-described modules of the computational operation apparatus 103, and includes an address bus, a data bus, and a control bus.

As described above, the communication among the image capturing apparatus 101, the camera platform apparatus 102, and the computational operation apparatus 103 is performed via the communication units, communication modules, etc. described above. However, hereinafter, for simplicity, descriptions of the communication units or the like used during the communication will be omitted. Similarly, although the communication between the image capturing apparatus 101 and the computational operation apparatus 103 is performed via the camera platform apparatus 102, the description of these apparatuses used during the communication is also omitted hereinafter.

Figure 4A:
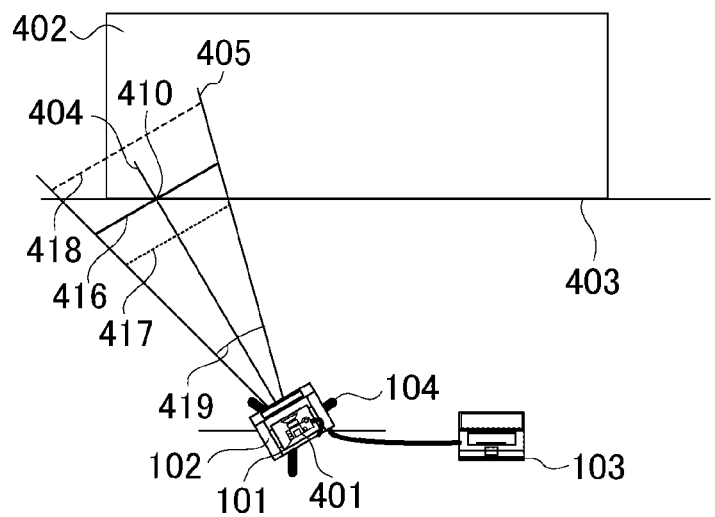
FIG. 4A is a diagram illustrating a manner of capturing an image of an inspection target by an image capturing system.
Figure 4B:
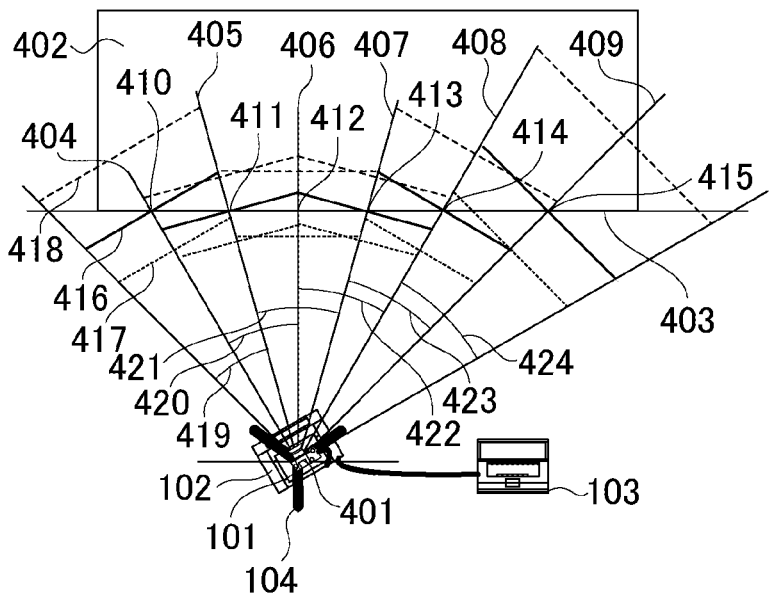
FIG. 4B is a diagram illustrating a manner of capturing an image of an inspection target by an image capturing system.
Figure 4C:
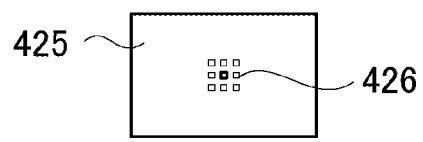
FIG. 4C is a diagram illustrating a manner of capturing an image of an inspection target by an image capturing system.

FIGS. 4A to 4C are diagrams used for explaining an operation performed when a wall surface 403 of a building 402 is an object given as an image capturing target, that is, an inspection target, and the wall surface 403 to be inspected is imaged by the image capturing system according to the present embodiment.

In the image capturing system according to the present embodiment, the image capturing apparatus 101 is disposed on the camera platform apparatus 102. The camera platform apparatus 102 repeatedly performs an operation of panning by a constant angle and then stopping. Each time the camera platform apparatus 102 stops, the image capturing apparatus 101 captures an image. As a result, the image capturing by the image capturing apparatus 101 is performed on each of sections into which the wall surface 403 of the building 402 to be inspected is divided.

FIG. 4A is a conceptual view showing, in a simplified manner, a manner in which the image capturing apparatus 101 of the image capturing system is capturing an image of a first section of the wall surface 403 of the building 402 according to the present embodiment, as viewed from above the building 402. In FIG. 4A, 401 denotes an installation position at which the tripod 104 is installed for capturing images of the wall surface 403 of the building 402 to be inspected. The camera platform apparatus 102 is disposed on the tripod 104, and the image capturing apparatus 101 is disposed on the camera platform apparatus 102, and thus the installation position 401 in FIG. 4A actually represents a location where the image capturing apparatus 101 is disposed. It may be desirable that the image capturing apparatus 101 is disposed on a vertical line at the center of the wall surface 403 that is an inspection target. However, at an actual site where an image is captured, it is not unusual that buildings or other obstacles may make it difficult to dispose the image capturing apparatus 101 on the vertical line at the center of the wall surface 403. In view of the above, it is assumed that the installation position 401 shown in FIG. 4A is off the vertical line at the center of the wall surface 403.

Furthermore, an image capturing direction 404 (a direction of an optical axis of the optical lens unit) of the image capturing apparatus 101 is set such that in a state in which a first section of the wall surface 403 to be inspected is subjected to the image capturing, an end of the wall surface 403 to be inspected is within an angle of view 419 as shown in FIG. 4A. In the image capturing of the first section, the image capturing apparatus 101 performs AF focusing on an intersection point 410 on the wall surface at which the wall surface 403 intersects a centerline of the angle of view 419 in the image capturing direction 404.

When the intersection point 410 is focused in this situation, a in-focus plane 416, on which a point image can converge on a smallest possible circle (a circle of confusion) on an imaging surface of the image sensor the image capturing apparatus 101, is in a flat plane. Even in a case where the distance from the imaging surface to the object deviates from the distance from the imaging surface to the in-focus plane 416 and thus the size of the circle where the point image converges is not the smallest, if the size of the circle is smaller than the pixel size of the image sensor, a focus shift cannot be recognized. The distance range as measured on the object side within which the focus shift cannot be recognized is called a depth of field. Note that the depth of field can be determined by a calculation based on the pixel size of the image sensor, the focal length and the aperture value of the optical lens unit, and the distance to the object. In the example shown in FIG. 4A, The front depth of field on a side closer to the image capturing apparatus with respect to the in-focus plane 416 can be represented by a plane 417. The rear depth of field on a side far from the image capturing apparatus can be represented by a plane 418. Thus, when part of the wall surface 403 is within the distance range from the plane 417 to the plane 418, this part is regarded as being in focus. Therefore, in the image capturing system according to the present embodiment, when the wall surface 403 shown in FIG. 4A is subjected to the image capturing, the installation position 401 of the image capturing apparatus 101 and the focal length and the aperture value of the optical lens unit are set in advance taking into account the depth of field described above.

FIG. 4B is a simplified conceptual view showing a manner, as seen from above the building 402, in which the camera platform apparatus 102 performs repeatedly a process of panning by a constant angle and then stopping, while each time the camera platform apparatus 102 stops, the image capturing apparatus 101 captures an image. In FIG. 4B, image capturing directions 405, 406, . . . , 409 each represent the center direction (the optical axis) in which the image capturing apparatus 101 captures an image, as with the image capturing direction 404 shown in FIG. 4A. The image capturing direction 405 indicates a direction in which the image capturing direction 101 captures an image when the camera platform apparatus 102 stops after the image capturing in the image capturing direction 404 is completed and then the camera platform apparatus 102 is driven to pan by a constant angle. Similarly, the image capturing directions 406, 407, . . . , 409 each indicate an image capturing direction employed when the camera platform apparatus 102 stops after the camera platform apparatus 102 is driven to pan by the constant angle. In FIG. 4B, angles of view 420, 421, . . . , 424 respectively represent angles of view of corresponding image capturing directions 405, 406, . . . , 409 of the image capturing apparatus 101 as with the angle of view 419 of the image capturing direction 404 shown in FIG. 4A.

Note that in a case where the wall surface 403 extends to the right further than is shown in the example in FIG. 4B and thus when the wall surface 403 is subjected to the image capturing, a further reduction occurs in the angle between the image capturing direction and the wall surface than in the example shown in FIG. 4B, it becomes impossible to obtain a high-definition captured image suitable for inspection. In such a case, image capturing is performed such that the installation position of the image capturing apparatus 101 is moved to the right and, at this moved installation position, the image capturing is performed while repeatedly performing an operation of pan driving by a constant angle and stopping in the above-described manner. The moving of the installation position of the image capturing apparatus 101 may be performed a plurality of times as required.

In the following description, for simplicity, it is assumed that driving using the camera platform apparatus 102 in a height direction of the building 402, that is, in the tilt direction is not performed but driving is performed only in the pan direction and the wall surface 403 divided into six sections to be inspected is subjected to image capturing on a section-by-section basis as shown in FIG. 4B. In FIG. 4B, intersections 411, 412, . . . , 415 are intersections between the wall surface 403 and the image capturing directions 406, 407, . . . , 409 as with the intersection 410 shown in FIG. 4A. Thus, in the image capturing operation, the image capturing apparatus 101 performs AF focusing on the wall surface with respect to the respective intersections 411, 412, . . . , 415.

In FIG. 4B, like the example shown in FIG. 4A, in-focus planes, planes representing the front depth of field, and planes representing the rear depth of field are indicated by thick solid lines, fine dotted lines, and rough dotted lines respectively for the cases where AF is performed at the intersection points 411 to 415. Regarding the range of the depth of field, it is known that the range of the rear depth of field is greater than the range of the front depth of field. Furthermore, as shown in FIG. 4B, it is also known that the range of the depth of field increases as the distance to the object increases.

Furthermore, when the wall surface 403 shown in FIG. 4B is subjected to the image capturing, image capture ranges on the wall surface 403 are defined such that large overlapping areas exist as can be seen from angles of view 419 to 424. This is to ensure that the object to be inspected, that is, the wall surface 403 in the present example, is completely covered, and to obtain a higher-quality inspection image with less aberration by utilizing a central part of an image circle of the optical lens unit used. In FIG. 4B, the image capture range is overlapped such that an end of the angle of view in capturing a previous frame is aligned with the center of the angle of view in capturing a next frame. However, the overlapping rate may be different from this example.

FIG. 4C is a diagram illustrating an example of a viewfinder screen 425 of the image capturing apparatus 101. In a case where a high-definition image of an object to be inspected is captured as in the present embodiment, a distance measurement point mark 426 representing a distance measurement point used in AF in image capturing is displayed on the viewfinder screen 425. In the image capturing apparatus 101, distance measurement points for AF are disposed over a wide area corresponding to substantially the entire surface of the viewfinder screen 425. However, when a high-definition image of a inspection target object is captured, a distance measurement point at the center that provides higher accuracy is used. In view of the above, in capturing a high-definition image of an inspection target object, only the high-accuracy distance measurement point mark 426 representing distance measurement points in the central area is displayed on the viewfinder screen 425. In the above description in which the procedure has been explained as to the process performed by the image capturing apparatus 101 disposed on the camera platform apparatus 102 to capture images of the wall surface 403 to be inspected, it is assumed that AF focusing is successful at all intersection points 410 to 415 in FIG. 4B.

Figures 5A, 5B:
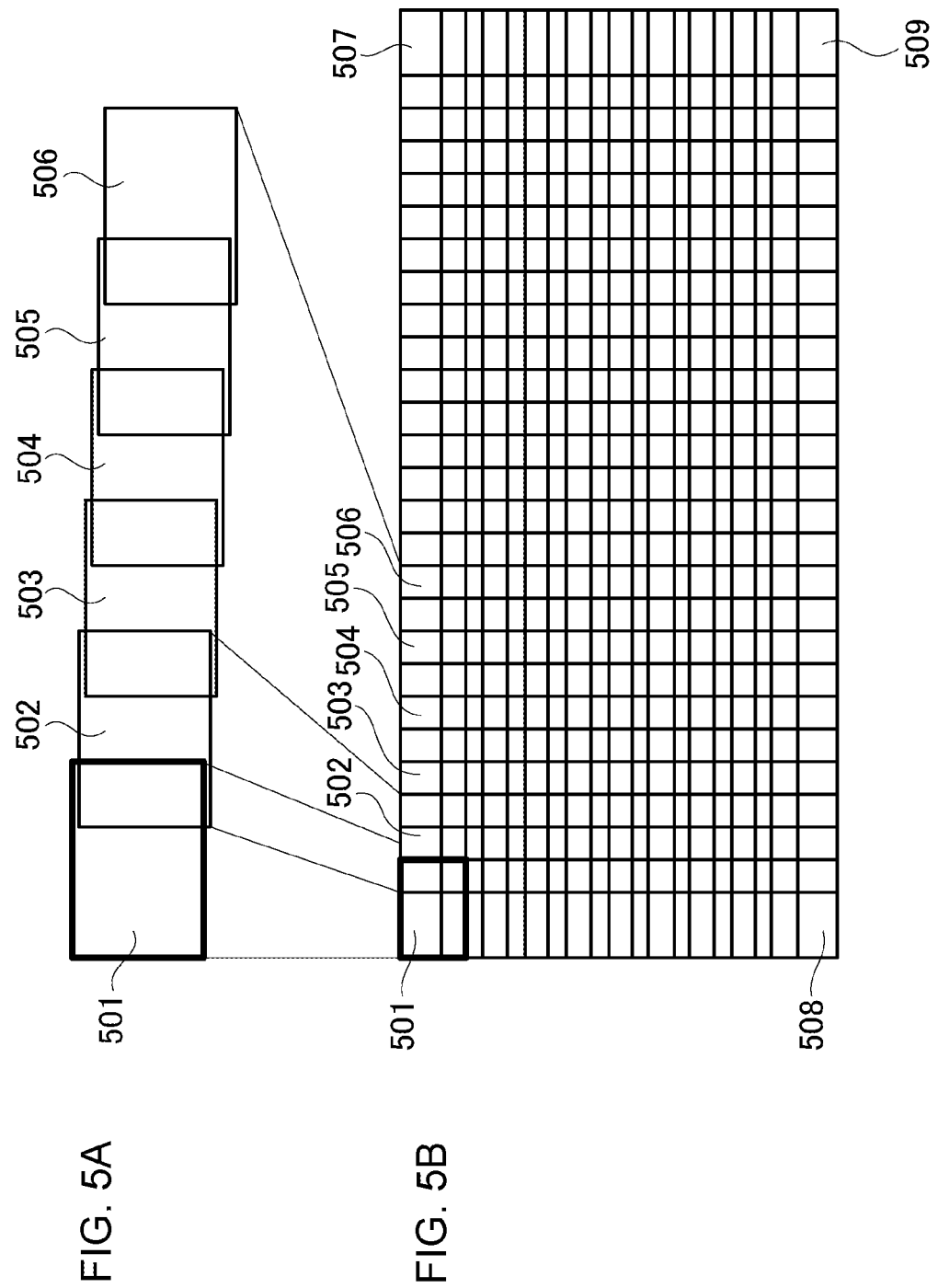
FIG. 5A and FIG. 5B are diagrams illustrating images captured by an image capturing system.

FIG. 5A and FIG. 5B are diagrams illustrating captured images obtained by performing image capturing on each of a plurality of sections of an inspection target object (a wall surface) as described above and illustrating a process performed on each captured image in the image capturing system according to the present embodiment.

In FIG. 5A and FIG. 5B, 501 to 507 respectively denote captured images of sections obtained by performing the image capturing such that the camera platform apparatus 102 is pan-driven in the above-described manner so as to move the image capturing direction of the image capturing apparatus 101 from an upper left end to an upper right end of the wall surface of the building under inspection. In the example shown in FIG. 5A, to make it easier to distinguish among the captured images 501 to 506, images are described such that they are slightly shifted in the vertical direction, although actually there is no vertical displacement. After the captured image 507 of the upper right section of the wall surface under inspection is obtained, the camera platform apparatus 102 is pan-drives such that the image capturing direction of the image capturing apparatus 101 is moved in a downward tilting direction by an amount corresponding to one section (including an overlapping area) and also moved to the left end of the wall surface. Thereafter, in the image capturing system, pan driving and image capturing are sequentially performed in the above-described manner so as to capture images of sections of the wall surface sequentially from the left-end section to the right-end section.

By performing the pan driving, tilt driving, and image capturing in the above-described manner, the image capturing apparatus 101 acquires the captured images 501 to 509 such that all sections of the wall surface of the building under inspection are captured with no omission. FIG. 5B shows a set of images captured via a series of pan driving and tilt driving of the camera platform apparatus 102 in the above-described manner. All these captured images are integrated into a single image by accurately aligning the images in the respective overlapping areas thereby generating an image as if the wall surface to be inspected was photographed with high definition. In inspection of an infrastructure facility or the like, using such an integrated image, an inspector performs an operation for checking the presence or absence of fine defect in the inspection target although a detailed description of the inspection is omitted.

Figure 6:
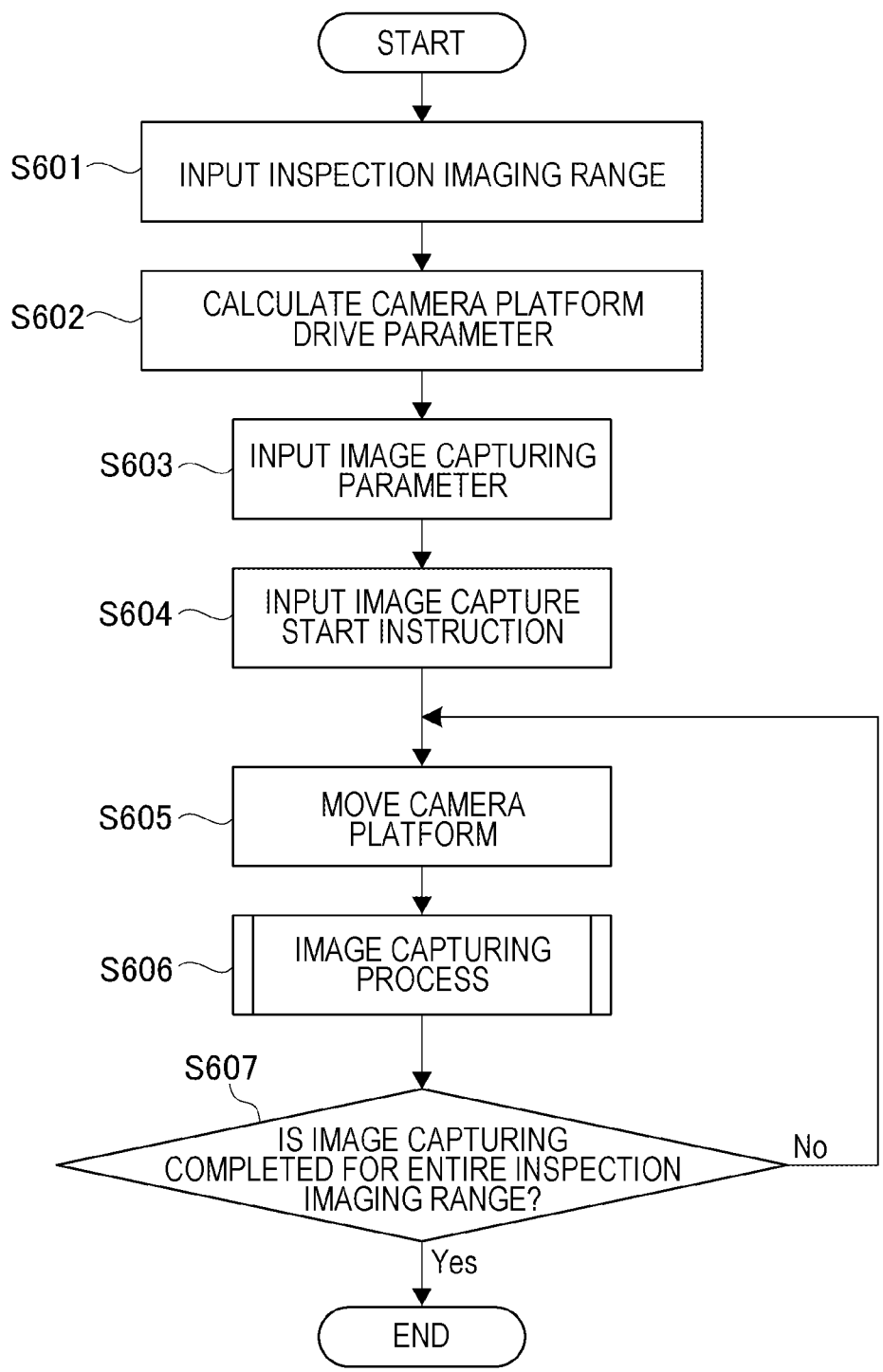
FIG. 6 is a flow chart illustrating an overall operation of an image capturing system.

FIG. 6 is a flow chart illustrating an overall operation flow of the entire image capturing system according to the first embodiment. Note that it is assumed that before the operation shown in the flow chart of FIG. 6 is started, settings such as those described above with reference to FIG. 4A and FIG. 4B have already been made. That is, the settings as to the installation position 401 of the imaging apparatus 101, selection of the aperture value and focal length based on the calculation of the depth of field in the optical lens unit to be used are completed. In the description of the flow chart in FIG. 6, processing steps S601 to S607 are denoted simply as S601 to S607, respectively. The same applies to other flow charts described later.

In S601 in the flow chart of FIG. 6, the camera platform apparatus 102 makes setting related to an image capture range of the wall surface or the like to be inspected and an overlapping rate between adjacent sections based on an instruction input by a user via the input/output I/F module 319. Furthermore, in S602, the camera platform apparatus 102 performs settings related to pan driving and tilt driving so as to make it possible to capture an image of each section of the wall surface to be inspected based on the information set in S601.

In S603, the image capturing apparatus 101 performs settings associated with an aperture value and a corresponding shutter speed and/or the like so as to properly capture an image of each of the sections selected in S601. Thereafter, the image capturing apparatus 101 waits for an image capture start instruction to be inputted by a user via the input/output I/F module 309. When the image capture start instruction is input by the user, then, in S604, the image capturing apparatus 101 notifies the camera platform apparatus 102 and the computational operation apparatus 103 that the image capture start instruction has been input.

Upon receiving the image capturing start instruction, the camera platform apparatus 102 performs, in S605, the pan driving and tilt driving operation to move the image capturing direction of the image capturing apparatus 101 such that the image capturing apparatus 101 captures images of respective sections as described above. Each time the pan driving by a constant angle is completed and the movement (change) of the image capturing direction is stopped, the camera platform apparatus 102 sends an image capture execution instruction to the image capturing apparatus 101 and the computational operation apparatus 103.

When the image capturing apparatus 101 and the computational operation apparatus 103 receive the image capture execution instruction from the camera platform apparatus 102, the image capturing apparatus 101 and the computational operation apparatus 103 execute, in S606, the image capture process. Details of the image capturing process performed in S606 will be described later. Next, in S607, the computational operation apparatus 103 determines whether the image capturing is completed over the entire inspection range of the inspection object (that is, for all sections to be inspected). In a case where it is determined that the image capturing is not yet completed, the process returns to S605. Thus, the camera platform apparatus 102 performs the pan driving to allow it to capture an image of a next uncaptured section. On the other hand, in a case where it is determined in S607 that the image capturing is completed for the entire inspection range (for all sections), the process shown in FIG. 6 performed by the image capturing system is ended.

Figure 7:
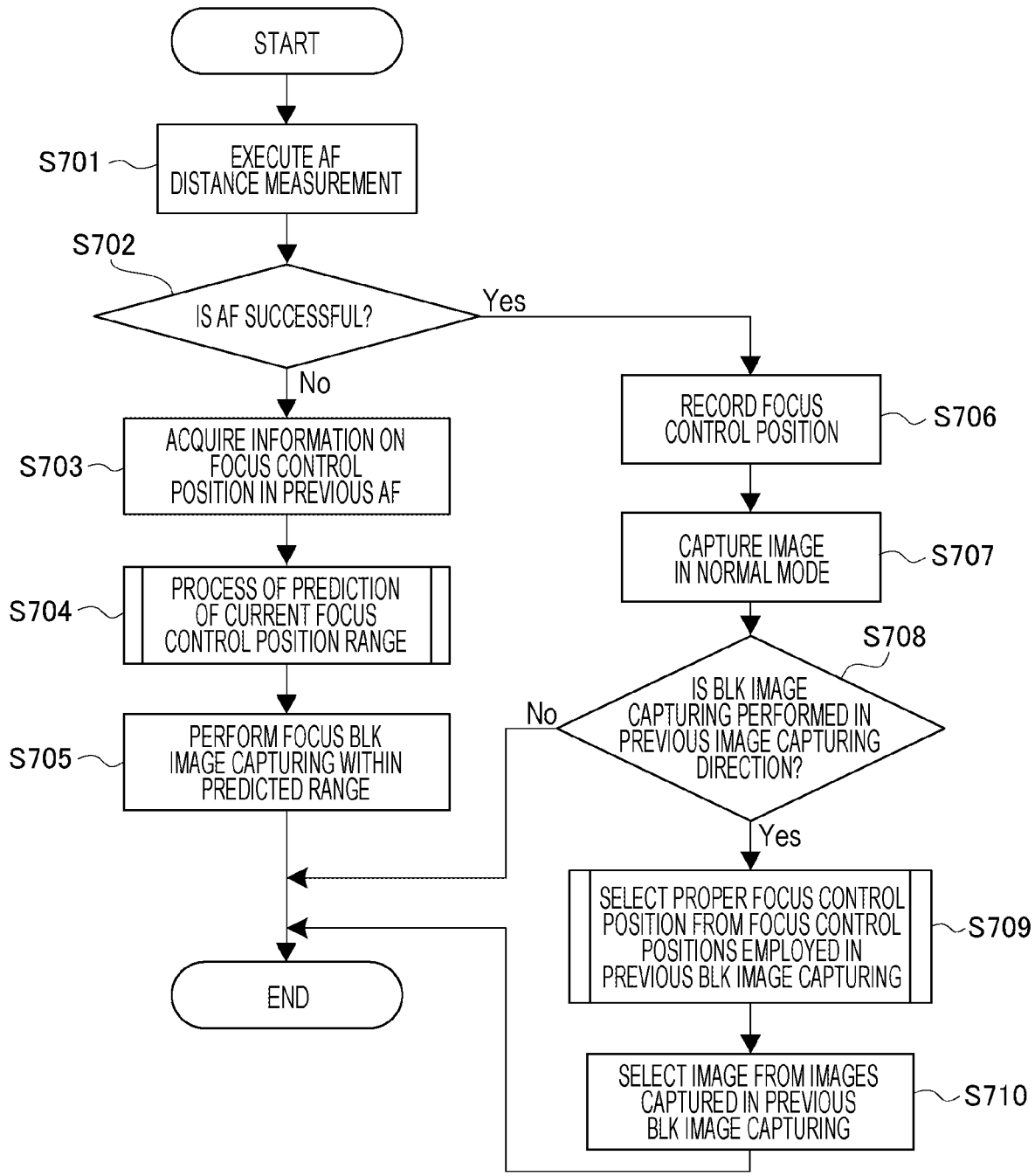
FIG. 7 is a flow chart of an image capturing process according to a first embodiment.

FIG. 7 is a flow chart illustrating an image capturing process performed by the image capturing apparatus 101 and the computational operation apparatus 103 in the image capturing system according to the present embodiment. More specifically, FIG. 7 shows details of the process in S606 shown in FIG. 6.

In S701 in FIG. 7, the image capturing apparatus 101 executes a distance measurement for AF by the AF distance measurement module 305. Furthermore, in S702, the image capturing apparatus 101 determines whether the distance measurement in S701 by the AF distance measurement module 305 is successful. A result of the determination as to whether the distance measurement by the image capturing apparatus 101 is successful is sent to the computational operation apparatus 103. In a case where it is determined that the distance measurement by the image capturing apparatus 101 is successful, the process by the image capturing system proceeds to S706. However, in a case where it is determined that the distance measurement fails, the process by the image capturing system proceeds to S703.

In a case where the computational operation apparatus 103 receives, from the image capturing apparatus 101, a determination result indicating that the distance measurement fails, then in S703, the computational operation apparatus 103 acquires, from the focus control position recording unit 216, information on a focus control position employed as a result of AF focusing by the image capturing apparatus 101 in capturing an image of a previous section.

Next, in S704, the computational operation apparatus 103 predicts a range within which the image capturing apparatus 101 is allowed to set the focus control position in the current image capturing direction. Furthermore, in S704, the computational operation apparatus 103 generates an image capture parameter for use in focus BLK image capturing within the predicted range, and sends the resultant image capture parameter to the image capturing apparatus 101. Details of the process in S704 will be described later. After S704, the process by the image capturing system proceeds to S705.

In S705, the image capturing apparatus 101 executes the focus BLK image capturing according to the image capture parameter related to the focus BLK image capturing within the range predicted by the computational operation apparatus 103. As a result of the execution of the focus BLK image capturing, a plurality of captured images acquired via the execution of the focus BLK image capturing are stored in the image recording unit 204 of the image capturing apparatus 101. Thereafter, the process shown in FIG. 7 by the image capturing system is ended.

On the other hand, if the determination result received from the image capturing apparatus 101 indicates that the distance measurement is successful, then in S706, the computational operation apparatus 103 records information, in the focus control position recording unit 216, as to the focus control position employed as a result of the AF focusing by the image capturing apparatus 101. In S707, the image capturing apparatus 101 performs image capturing in a normal mode.

Next, in S708, the computational operation apparatus 103 determines whether the focus BLK image capturing was performed in the previous image capturing of the section. In a case where it is determined in S708 that the focus BLK image capturing was performed in the previous image capturing of the section.

In contrast, in a case where it is determined in S708 that the focus BLK image capturing was performed in the previous image capturing of the section, the computational operation apparatus 103 selects, in S709, a proper focus control position from focus control positions used in the previous focus BLK image capturing. Details of the process in S709 will be described later.

Furthermore, in S710, the computational operation apparatus 103 selects a proper captured image from the images which were captured in the previous focus BLK image capturing and recorded in the image recording unit 204 of the image capturing apparatus 101. That is, the computational operation apparatus 103 selects, as the proper captured image, a captured image corresponding to the proper focus control position selected in S709. Thereafter, the process shown in FIG. 7 by the calculation system is ended.

Figure 8:
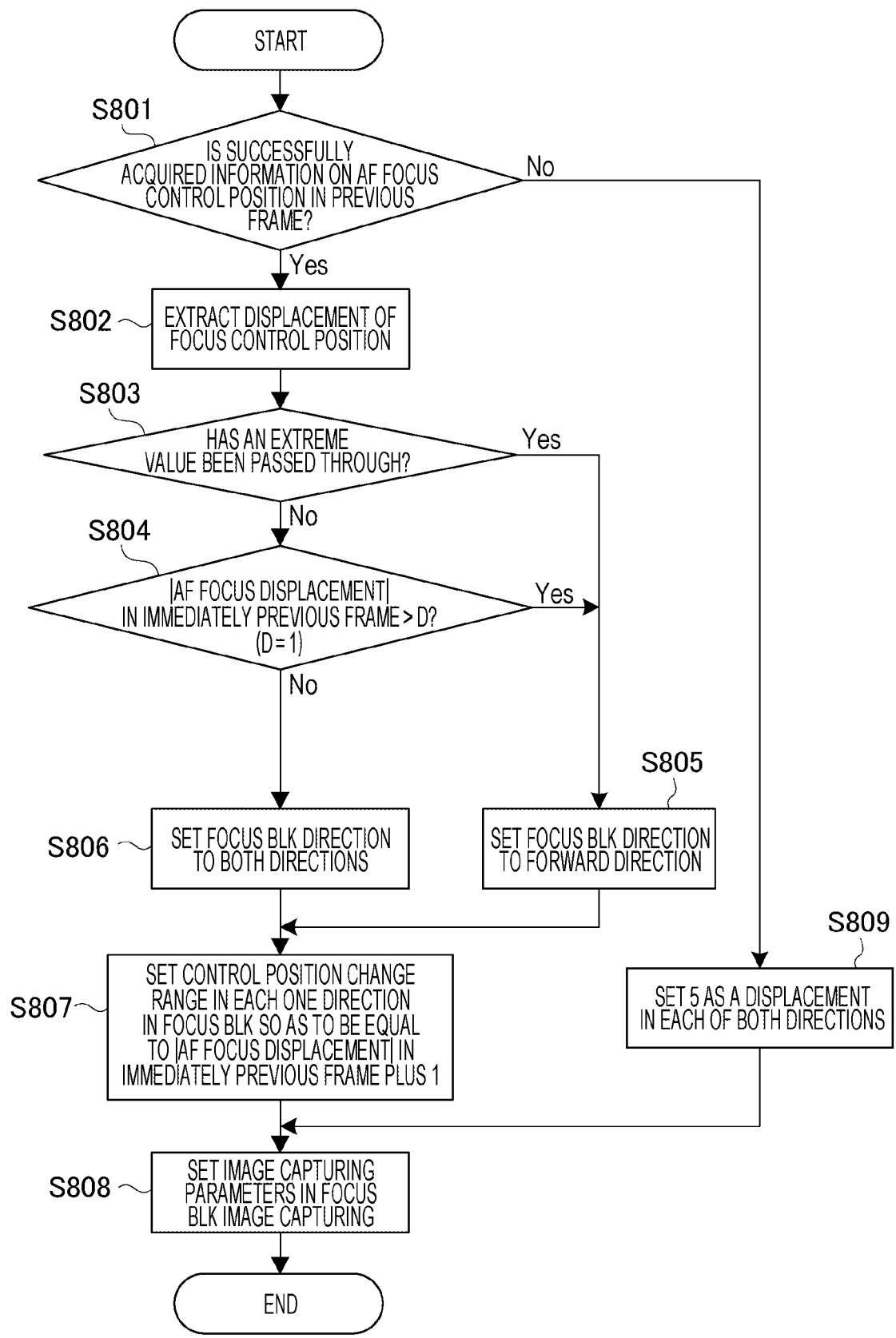
FIG. 8 is a flow chart of a prediction calculation process according to the first embodiment.

FIG. 8 is a flow chart of a focus position range prediction process performed by the computational operation apparatus 103 of the image capturing system according to the present embodiment. More specifically, FIG. 8 shows details of the process in S704 shown in FIG. 7.

In S801 in FIG. 8, the focus range estimation unit 215 of the computational operation apparatus 103 determines whether the focus BLK image capturing control unit 214 has successfully acquired the AF focus control position employed in the previous section image capturing from the focus control position recording unit 216. In a case where the focus control position is not acquired, the process by the computational operation apparatus 103 proceeds to S809 which will be described later. In a case where the focus control position has been successfully acquired, the process by the computational operation apparatus 103 proceeds to S802.

In a case where the AF focus control position employed in the previous section image capturing is successfully acquired in S801, the focus range estimation unit 215 extracts, in S802, an amount of displacement of the focus control position based on the focus control position employed in the previous section image capturing.

Next, in S803, the focus range estimation unit 215 determines whether the displacement of the focus control position has passed through an extreme value. Note that the extreme value is such a value of the focus control position in the image capturing direction that is obtained when the distance between the wall surface 403 being captured as the object and the image capturing apparatus 101 passes through a closest point in the rotation driving such as the pan driving or the tilt driving of the camera platform apparatus 102. In a case where it is determined that the displacement of the focus control position has passed through an extreme value, the process by the computational operation apparatus 103 proceeds to S805 described below. On the other hand, in a case where it is determined in S803 that the displacement of the focus control position has not passed through the extreme value, the focus range estimation unit 215 advances the process to S804.

After proceeding to S804, the focus range estimation unit 215 determines whether the absolute value of the displacement amount of the AF focus control position employed in the immediately previous section image capturing is larger than a predetermined value (D). In a case where the focus range estimation unit 215 determines that the absolute value of the displacement amount of the focus control position is larger than the predetermined value (D), the focus range estimation unit 215 advances the process to S805, but in a case where the focus range estimation unit 215 determines that the absolute value is not larger than the predetermined value (D), the focus range estimation unit 215 advances the process to S806. Note that the predetermined value (D) may be set, for example, such that D=1.

In a case where the process has proceeded to S805, the focus range estimation unit 215 sets the direction of changing the focus control position in the focus BLK image capturing of the current section in the same direction as the direction in which the focus control position was changed in the BLK image capturing of the previous section. On the other hand, in a case where the process has proceeded to S806, the focus range estimation unit sets the direction such that the focus control position is to be changed in both directions in the current execution of focus BLK image capturing of the section. After S805 or S806 is completed, the focus range estimation unit 215 advances the process to S807.

In S807, the focus range estimation unit 215 sets the one-side variable range within which the focus control position is to be changed in the focus BLK image capturing is given by a value equal to the absolute value of the displacement amount of the AF focus control position in the immediately previous section image capturing plus a predetermined value "1" (+1). After S807, the process by the computational operation apparatus 103 proceeds to S808.

In a case where the process has proceeded to S809, the focus range estimation unit 215 makes setting such that the focus control position is to be changed in both directions in the current execution of focus BLK image capturing in the section image capturing and such that "5" is set as a range in which the focus position is to be changed in each of both directions. After S809, the process by the computational operation apparatus 103 proceeds to S808.

In a case where the process has proceeded to S808, the focus BLK image capturing control unit 214 sets image capturing parameters used by the image capturing apparatus 101 in performing focus BLK image capturing based on the value set by the focus range estimation unit 215. Thus, the image capturing apparatus 101 performs focus BLK image capturing according to the image capturing parameters related to the focus BLK image capturing set based on the value estimated by the focus range estimation unit 215. Thereafter, the process by the calculation system in FIG. 8 is ended.

Figure 9:
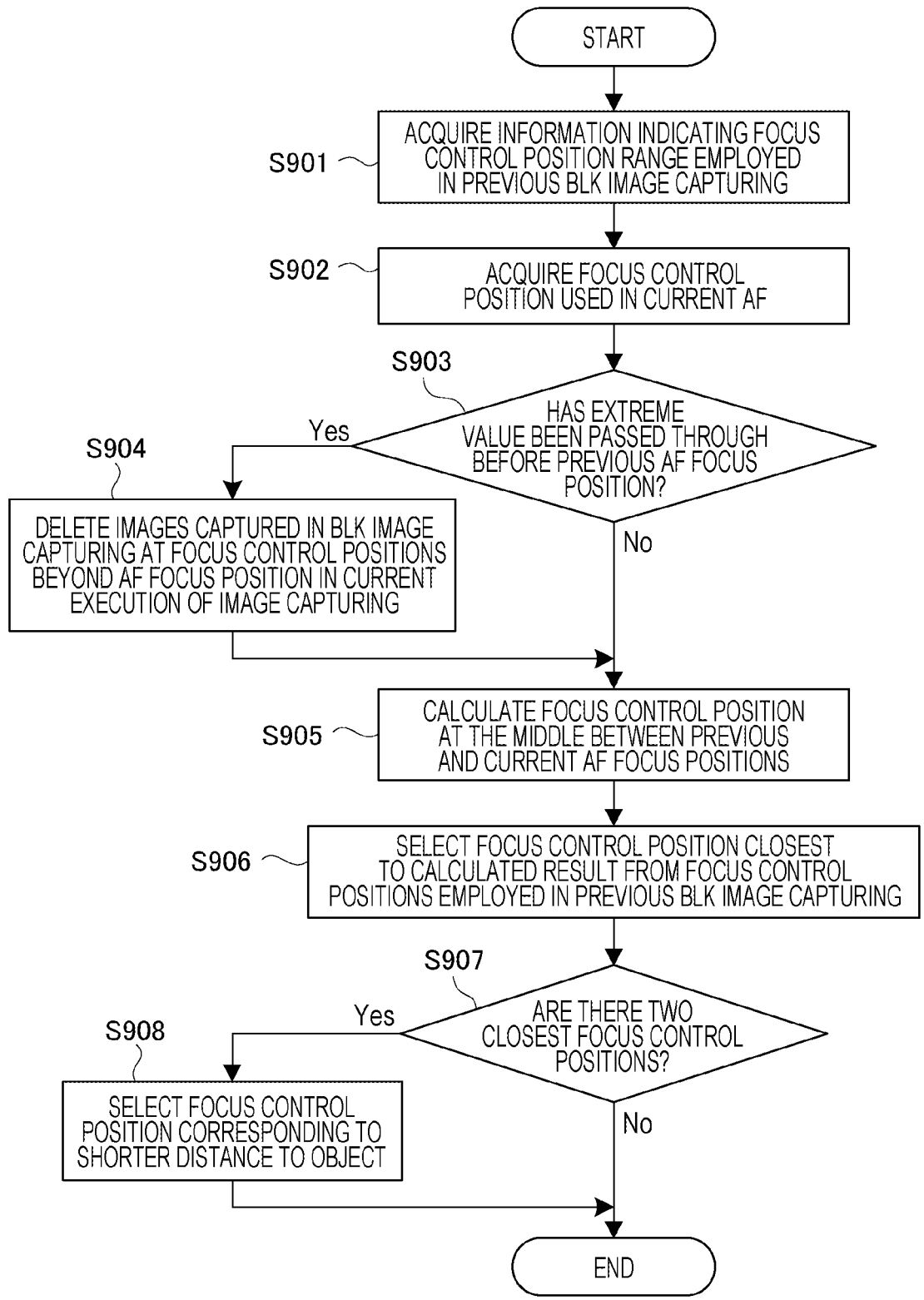
FIG. 9 is a flow chart of a process of selecting a focus control position.

FIG. 9 is a flow chart of a process performed by the computational operation apparatus 103 of the image capturing system to select a proper focus control position from focus control positions used in the previous execution of focus BLK image capturing according to the present embodiment, and more specifically. Note that this flow chart in FIG. 9 shows details of the processing flow in S709 in FIG. 7.

In S901 in FIG. 9, the image selection unit 217 acquires the focus control position range used in the previous execution of focus BLK image capturing in the section image capturing from the focus control position recording unit 216 via the focus BLK image capturing control unit 214. Next, in S902, the image selection unit 217 acquires the AF focus control position used in the current execution of section image capturing.

Next, in S903, the image selection unit 217 determines whether or not the displacement of the focus control position based on AF in the previous execution of section image capturing has passed through an extreme value at which the displacement direction is reversed. In a case where it is determined that the displacement of the focus control position has not yet passed through the extreme value, the image selection unit 217 advances the process to S905. However, in a case where it is determined that the displacement has passed through the extreme value, the process proceeds to S904.

After proceeding to S904, the image selection unit 217 deletes images such that, of images captured in focus control positions used in the previous execution of focus BLK image capturing, such images in a range exceeding the AF focus control position in the current execution of image capturing are deleted from the image recording unit 204 of the image capturing apparatus 101. After S904, the image selection unit 217 advances the process to S905.

In S905, the image selection unit 217 calculates an intermediate focus control position between the AF focus control position in the previous image capturing and the AF focus control position in the current image capturing.

Next, in S906, the image selection unit 217 selects a focus control position closest to the focus control position calculated in S905 from focus control positions used in the previous execution of the focus BLK image capturing. As a result, in S710 in FIG. 7 described above, a captured image is selected that corresponds to the focus control position selected in S906.

Next, in S907, the image selection unit 217 determines whether there are two focus control positions selected in S906 as closest focus control positions. In a case where it is determined in S907 that there are not two focus control positions selected as closest ones but there is only one focus control position selected as the closest one, the processing in FIG. 9 by the calculation system is ended.

On the other hand, if it is determined that there are two focus control positions selected as closest ones, then, in S908, the image selection unit 217 selects a focus control position with a shorter image capture distance. In this case, in S710 in FIG. 7 described above, a captured image corresponding to the focus control position selected in S908 as the one with the shorter image capture distance is selected. Thereafter, the process by the calculation system in FIG. 9 is ended.

Figure 10:
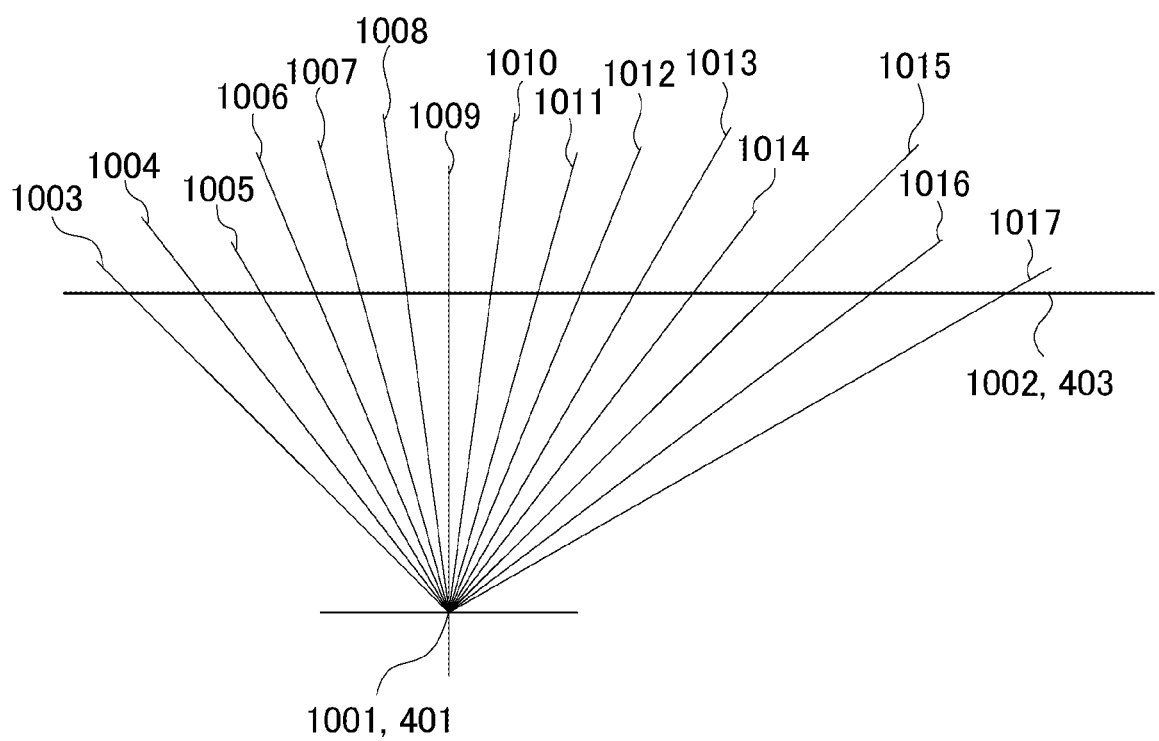
FIG. 10 is a diagram illustrating various image capturing directions according to the first embodiment.

FIG. 10 is a diagram showing respective image capturing directions in which an inspection target object (a wall surface) is sequentially captured on a section-by-section basis in the image capturing system according to the present embodiment.

In FIG. 10, a position 1001 represents the installation position 401 of the camera platform apparatus 102 on which the above-described image capturing apparatus 101 is disposed, and a wall surface 1002 represents the wall surface 403 of the building 402 to be inspected. Directions 1003, 1004, . . . , 1017 represent image capturing directions which are sequentially selected by the camera platform apparatus 102 performing an operation of pan driving and then stopping in each direction to capture an image of a section. Note that the pan driving is performed in a direction from left to right as seen in the figure. In the example shown in FIG. 10, the section image capturing is performed in each of the image capturing directions 1003 to 1017.

FIGS. 11A to 11G are respectively tables showing the success or failure of AF, the predicted range of the focus control position, the focus control position, the change in displacement amount of the focus control position, etc., for a case where the image capturing is performed in the respective image capturing directions 1003 to 1017 shown in FIG. 10 which are sequentially selected.

In FIGS. 11A to 11G, "image capturing direction number" describes the numbers respectively assigned to the image capturing directions 1003 to 1017 shown in FIG. 10. "Success or failure of AF" represents the success of failure of AF in the image capturing in the directions denoted by the image capturing direction numbers where ○ indicates success while x indicates failure. "Predicted F control position range" indicates the range of the focus control position predicted in S704 in FIG. 7. Each value described in parenthesis indicates the number of frames captured in focus BLK image capturing in the direction number. "Focus control position" indicates the focus control position determined by AF in image capturing in each image capturing direction, or the focus control position selected from the focus control positions performed later. "Displacement of F control position" indicates a difference in focus control position represented from a value employed in previous image capturing.

Figure 12:
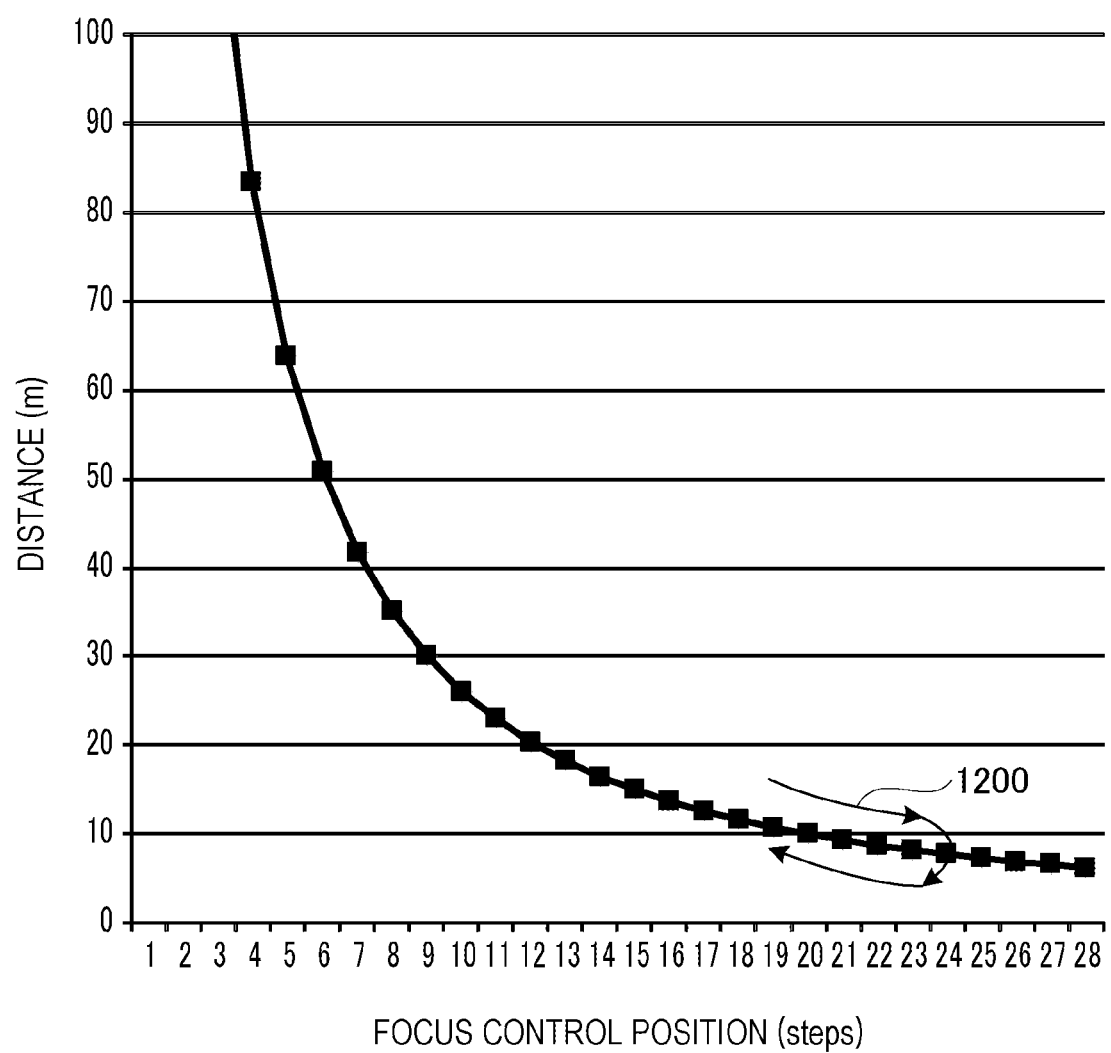
FIG. 12 is a diagram illustrating a relationship between a focus control position and a distance to an object.

FIG. 12 is a diagram illustrating an example of a relationship between the focus control position (steps) and the focus distance (m) of the optical lens unit used in the image capturing apparatus 101 of the image capturing system according to the present embodiment. That is, the focus control position is represented, for example, by the number of steps when the focus lens of the optical lens unit is driven in steps.

Referring to FIGS. 10 to 12, processing performed in the image capturing system according to the present embodiment shown in the flow charts of FIGS. 6 to 9, various apparatuses in the image capturing system, and operations performed by a user are described further in a simplified and more easily understandable manner with reference to a practical time series operation.

In a case where it is planned to perform image capturing on a wall surface 1002 given as an inspection target as shown in FIG. 10, when the processing shown in FIG. 6 is started in the image capturing system according to the present embodiment, the processing is performed as follows. First, in S601, a user performs inputting to set the camera platform apparatus 102 in terms of the image capture range. In S602, preparations are made for panning the camera platform apparatus 102 from an image capturing direction 1003 to an image capturing direction 1017. Furthermore, in S603, the user sets the image capturing apparatus 101 in terms of image capturing parameters such as the depth of field, exposure, and the like. Thereafter, if an image capture start instruction is issued in S604 by the user, then in S605 the camera platform apparatus 102 performs pan driving to an the image capturing direction 1003 in which first-time image capturing is to be performed. Furthermore, in S606, the image capturing apparatus 101 and the computational operation apparatus 103 start the image capturing process.

In the image capturing process in S606, as shown in the flow chart in FIG. 7, first, in S701, the AF distance measurement unit 206 of the image capturing apparatus 101 performs distance measurement for AF on the object. In a case where a first-time section image capturing is performed, for example, if an end portion of the building 402, that is, an end portion of the wall surface 403 is captured in the center of the viewfinder screen 425 of the imaging apparatus 101, the end portion is detected and thus it is ensured that the AF distance measurement is performed successfully. In a case where the installation position of the image capturing apparatus 101 is moved a plurality of times during the image capturing, it is desirable to capture specific landmarks or the like on the wall surface 403 defined when the wall surface 403 is divided into sections thereby ensuring that the AF distance measurement is successful. As a result of this, it is determined in S702 that AF is successful, and the process can proceed to S706 in which the focus control position obtained as a result of the distance measurement in S701 is recorded as information for driving the focus drive unit 205 of the image capturing apparatus 101.

In FIG. 11A, the success or failure of AF in the image capturing direction 1003 (○ indicating success) and a value indicating the focus control position, for example, 19 steps, are described. Then, in S707, the focus lens of the optical lens unit is driven according to the focus control position and the image capturing is performed in a normal mode. When the image capturing in the image capturing direction 1003 is performed, the process proceeds to next step S708, in which it is determined that there is no record of the previous image capturing, and thus the process shown in FIG. 7 is ended. Thereafter, the process proceeds to S607 in FIG. 6. In this specific situation, the image capturing is not yet completed for the entire inspection range. Thus, the process returns to S605, and the camera platform apparatus 102 is driven so as to pan for the purpose to perform image capturing on a next section and the image capturing process is performed in S606.

Thereafter, in FIG. 7, as shown in FIG. 11A, the AF distance measurement is also successful in the image capturing directions 1004 and 1005, and the processing from S702 to S706 is performed. In S707, the image capturing is performed in the normal mode. In S708, because the previous image capturing was performed in the normal mode, and thus the process shown in FIG. 7 is ended. In S607, it is determined that the image capturing is not completed for the inspection range, and thus the process returns to S605. In S605, the camera platform apparatus 102 is driven to pan to a new image capturing direction 1006, and in S606, the image capturing process is performed.

Next, as shown in FIG. 11A, if the AF distance measurement fails (x) in the image capturing direction 1006, then it is determined in S702 that AF is not successful, and thus the process proceeds to S703. In S703, the focus control position in previous AF is acquired from the focus control position recording unit 216, and then the process proceeds to S704.

In step S704, as shown in the flow chart in FIG. 8, first, in S801, it is determined whether or not the focus control position in the previous image capturing has been acquired. In the example shown in FIG. 11A, a value of 22 steps is acquired as the focus control position in the previous image capturing in the image capturing direction 1005. Thus, the process proceeds to S802.

In step S802, the displacement amount of the focus control position in the image capturing in the image capturing direction 1005, that is, the difference in focus control position between the image capturing directions 1004 and 1005 is extracted as "1" (22−21=1). In S803, it is determined whether or not the change in the recorded focus control positions has passed through the extreme value described above.

At this point of time, it is unknown whether passing through the extreme value has occurred in a range between the image capturing direction 1003 and the image capturing direction 1006, and thus the process proceeds to S804. Note that the determination in S804 as to the passing through the extreme value may be performed by detecting an occurrence of reversion of increasing or decreasing displacement of the focus control positions extracted in S802.

Next, in S804, it is determined whether or not the absolute value of the displacement amount of the focus control position in the previous image capturing is larger than a predetermined value (D, which is 1 in the present example). Referring to FIG. 11A, the displacement amount of the focus control position in the previous image capturing direction 1005 is "1", and thus the process proceeds to S806. In step S806, setting is made such that the focus control position in focus BLK image capturing is to be shifted in both directions with respect to the focus control position in the previous image capturing.

In S807, setting is made such that the focus control position is to be shifted in each of both directions by an amount equal to the amount of displacement in the focus control position in the previous image capturing plus 1 is set as the amount of the displacement. In S808, image capturing parameters for focus BLK image capturing are set in the image capturing apparatus 101 such that the focus control position is shifted within a range of ±2 with respect to the focus control position in the previous image capturing direction. Thereafter, the process in FIG. 8 is ended. In S705 in FIG. 7, in the image capturing direction 1006, a total of five focus BLK images are captured respectively at the focus control positions of 20 to 24 steps as shown in FIG. 11A.

Next, in S607 in FIG. 6, it is determined that the image capturing is not yet entirely completed, and thus the process proceeds to S605. In S606, the image capturing in a new image capturing direction 1007 is started. In the image capturing process in FIG. 7, in S701, distance measurement for AF in the image capturing direction 1007 is performed. As shown in FIG. 11B, this distance measurement is successful, and the process proceeds to S706. In S706, the focus control position based on the successful AF distance measurement is recorded, and then in S707, at this focus control position, the image capturing is performed in a normal mode. Thereafter, in S708, it is determined whether or not focus BLK image capturing was performed in the previous image capturing. In this specific case, the focus BLK image capturing was performed in the previous image capturing direction 1006, and thus the process proceeds to S709.

In S709, as shown in the flow chart in FIG. 9, first in S901, information on a plurality of focus control positions used in the previous focus BLK image capturing is acquired. That is, values of 20 steps to 24 steps are acquired. Next, in step S902, the AF focus control position used in the current image capturing direction 1007 is acquired. In S903, it is determined whether the displacement of the focus control position has passed the extreme in the previous image capturing or before then. In this specific case, it is still unknown, and thus the process proceeds to S905.

In S905, an intermediate value between the value of "24" of the focus control position in the current image capturing direction 1007 and the value of "22" of the focus control position in the previous image capturing in which the previous AF was successful, that is in the image capturing in the image capturing direction 1005, and "23" is obtained as the calculation result. Next, in 906, the value "23" of the focus control position used in the image capturing direction 1006 is closest to the value obtained as the result of the calculation in S905, and thus this value "23" is selected. Furthermore, in S907, since there is only one value that is closest to the calculation result in S905, the process in FIG. 9 is ended. Thus, the process in S709 is ended. Note that since the value "23" is selected as the focus control position in the image capturing direction 1006, the displacement amounts of the focus control position in the image capturing directions 1006 and 1007 are also determined.

Next, in S710 in FIG. 7, based on the value "23" of the focus control position selected in S906, a captured image is selected from the plurality of captured images acquired in the focus BLK image capturing in the image capturing direction 1006, and the process is ended. FIG. 11B shows a state in which the value "23" of the focus control position selected in the image capturing direction 1006 is selected after the image capturing in the shooting direction 1007 is performed.

Thereafter, the process from S607 to S606 in FIG. 6 is performed also in the image capturing direction 1008. In S707, the image capturing is performed in the normal mode using the value "24" as the focus control position by AF. Thereafter, the process in FIG. 7 is ended and the process proceeds to S607. From S607, the process returns to S605 again, and the camera platform apparatus 102 is driven to pan so as to move the image capturing direction to an image capturing direction 1009, and the distance measurement for AF is performed in S701 in FIG. 7.

In the example shown in FIG. 11C, the distance measurement in the image capturing direction 1009 fails, and thus, in S703, the focus control position in the previous autofocus is acquired like in the image capturing direction 1006. That is, the value "24" is acquired as the focus control position in the image capturing direction 1008. Then in S704, the process in FIG. 8 is started. In this case, the process proceeds from S801 to S802, and "0" is acquired as the displacement amount of the focus control position. Thereafter, as in the case of the image capturing direction 1006, the process proceeds from S803 to S804, S806, and further to S807.

In S807, the displacement amount of the focus control position plus 1 is set as a shift amount in each one of directions in the focus BLK image capturing. That is, in S808 in this execution, image capturing parameters in the focus BLK focus BLK image capturing are set in the image capturing apparatus 101 such that such that the focus control position is shifted within a range of ±1 with respect to the focus control position in the previous image capturing direction. Thereafter, the process in FIG. 8 is ended. In S705 in FIG. 7, in the image capturing direction 1009, a total of three focus BLK images are captured respectively at the focus control positions from "23" to "25" as shown in FIG. 11C.

Next, the process returns from S607 to S605. In the image capturing direction 1010, AF distance measurement in S701 is successful, and thus the process proceeds from S702 to S706 and further S707, in which the image capturing is performed in the normal mode. In S708, as in the case of the image capturing direction 1007, the process proceeds to S709, and the process shown in FIG. 9 is started. Also in this case, the process is performed in a similar as in the image capturing direction 1007. In S905, "24" is selected as the intermediate focus control position between "24" of the focus control position in the image capturing direction 1008 and "24" of the focus control position in the image capturing direction 1010. As a result, in S710 in FIG. 7, an image captured at the focus control position of the value "24" selected in S906 is selected from the three images captured in the focus BLK image capturing performed in the image capturing direction 1009. Thereafter, the process is ended.

Next, as shown in FIG. 11E, in the image capturing direction 1011, AF distance measurement is successful, and the image capturing is performed at the focus control position "24". Next, in the image capturing direction 1012, AF distance measurement fails, focus BLK image capturing is performed at focus control positions from "23" to "25". Furthermore, in the next image capturing direction 1013, the image capturing is performed in the normal mode at the focus control position "22" shown in FIG. 11F. As a result, in S709 in FIG. 7, an image captured at the focus control position "23" is selected from images captured in the focus BLK image capturing in the image capturing direction 1012.

Next, as shown in FIG. 11A, AF distance measurement is successful in the image capturing in the image capturing direction 1014. However, the AF distance measurement fails in the image capturing in the image capturing direction 1015. In this case, in S802 shown in FIG. 8, which is an internal process of S704, −1 is detected as the displacement amount of the focus control position in the image capturing direction 1014, and the extreme value occurrence determination is performed in S803 from focus control positions recorded in S706. That is, as shown in FIG. 11F, the displacement of the focus control position changes from a positive direction to a negative direction as represented by an arrow 1200 in FIG. 12, and thus it is determined in S803 that the value of the focus control position has passed through an extreme value.

As a result, the process proceeds from S803 to S805, and setting in terms of the shifting direction of the focus control position in focus BLK image capturing is made such that the shifting is to be performed in one direction from the focus control position in the previous image capturing. Then in S807, the absolute value of the displacement amount of the focus control position in the previous image capturing, that is, "2" given by 1+1 in this specific case, is set as the shift amount in one direction. Thus, in S808, an image capturing parameter is set in the image capturing apparatus 101 such that the focus control position is shifted in the focus direction within the range of "2" in the minus direction, that is, by the same amount as the displacement amount in the previous image capturing with respect to the focus control position in the previous image capturing direction.

Thereafter, the process in FIG. 8 is ended. In S705 in FIG. 7, in the image capturing direction 1015, a total of three focus BLK images are captured at the focus control positions from "21" to "19" as shown in FIG. 11F. Next, in the image capturing direction 1016, AF distance measurement is successful shown in FIG. 11G, and thus the process proceeds from S708 to S709 in FIG. 7, in which the process shown in FIG. 9 is started.

In this case, in S903, since the extreme value has been passed through, the process proceeds to S904, in which, of images captured in the focus BLK image capturing in the image capturing direction 1015, such captured images whose focus control positions exceeds (smaller than, in this case) the focus control position employed in the image capturing direction 1016 are deleted. This is because when the focus control position has already passed through the extreme value, the value of the focus control position is smaller in the image capturing direction 1016 than in the image capturing direction 1015 in which the previous frame was captured. However, among the focus control positions from "21" to "19" in the image capturing direction 1015, there is no focus control position of "18" or lower that exceeds the focus control position "19" in the negative direction of the image capturing direction 1016. Therefore, no captured images are deleted and the process proceeds to S905.

In S905, a calculation is performed to determine the intermediate value between the focus control position "21" in the image capturing direction 1014 and the image capturing direction "18" in the image capturing direction 1016, that is, "19.5" is obtained as a result of the calculation, and the process proceeds to S906. In S906, a focus control position closest to the value calculated in S905 is selected from the focus control positions in the focus BLK image capturing in the image capturing direction 1015.

In this case, the calculated value "19.5" is an intermediate value between "20" and "19" which are focus control positions in the focus BLK image capturing, and thus it is determined in S907 that there are two close focus control positions, and thus the process proceeds to S908. In S908, "20" is selected as a value that is, of the two focus control positions, closer to the object, and the processing in S709 ends. That is, in S908, a focus control position which results in a shorter focus distance to the object and which results in a lager depth of field the rear depth of field having a deeper depth of field is selected as the focus control position having a closer shooting distance to the object.

Next, in S710, an image captured at the focus control position "20" is selected as a captured image in the image capturing direction 1015, and the process in S606 in FIG. 6 is ended. That is, in S710 in this case, the captured image is elected based on the focus control position taking into account the fact that the rear depth of field has a greater depth of field. Thereafter, the process proceeds from S607 to S605, and the image capturing is performed in a new image capturing direction 1017. In this case, as in the image capturing direction 1003, an end of the wall surface 1002 is detected and thus the image capturing by AF is successful. In S607, it is determined that the image capturing of the inspection range is completed, and the process is ended.

As described above, in the image capturing system according to the present embodiment, in a case where AF focusing fails, the range of the focus control position is predicted based on the information on the focus control position employed in previous AF, and focus BLK image capturing is performed based on the predicted range. Furthermore, in the image capturing system according to the present embodiment, when AF is successful in the current image capturing and thus the image capturing is performed in the normal mode, if focus BLK image capturing was performed in the previous image capturing, an proper image is selected from a plurality of images captured in the focus BLK image capturing. Thus, in the image capturing system according to the present embodiment, when the inspection target is divided in into small parts and a large number of high-definition images are sequentially captured over the entire inspection target, even if, for example, AF distance measurement fails, it is possible to obtain a captured mage in focus. That is, in the image capturing system according to the present embodiment provides, when high-definition images for inspection of an infrastructure facility is automatically and continuously captured, even in a situation in which AF does not work properly, it is possible to continue the image capturing without re-capturing an image due to a failure of focus.

In the present embodiment, in a case where the range of the focus control position is predicted when AF fails, information on the change in the focus control position is used assuming that the camera platform is driven to pan. However, information may be used assuming that the camera platform is driven to tilt. Furthermore, by using the information on tilt driving in addition to the information on pan driving, higher-accuracy prediction of the focus control position may be performed and the number of images captured using focus BLK image capturing may be reduced.

In the present embodiment, a description is omitted as to processing performed when AF successively fails twice or more in the image capturing system. To handle such a situation, a process of detecting a second or more AF failures during the process from S801 to S809 in FIG. 8 may be provided. In this case, in S809, a value of "5" is set as a shifting range in one direction in the focus BLK image capturing, As the median focus control position, and an intermediate value of the values of the focus control position in the focus BLK image capturing in a previous execution is used as the median focus control position. By employing such a configuration, it becomes possible to continue image capturing to obtain images in focus even when AF fails two or more times in succession.

Furthermore, in the present embodiment, of a plurality of images captured in focus BLK image capturing, an image captured at a clearly inappropriate focus control position is deleted. Alternatively, all images corresponding to focus control positions that are not selected in the process in FIG. 9 may be deleted. By employing such a configuration, it becomes possible to prevent wasteful use of the capacity of the recording medium due to a large amount of image capturing.

Furthermore, although the image capturing system according to the present embodiment is configured to include a plurality of apparatuses, the image capturing system may be configured such that one of apparatus includes other apparatuses, or the image capturing system may be configured to include a single apparatus. Furthermore, in the present embodiment, the image capturing apparatus 101 and the computational operation apparatus 103 are capable of arbitrarily acquiring a value of a focus control position and capable of setting a value. However, in a case where the image capturing system is capable of specifying the focus driving amount only by relative values, the image capturing apparatus 101 and the computational operation apparatus 103 may be configured as follows. For example, the image capturing apparatus 101 or the computational operation apparatus 103 acquires and manages all driving information including information on AF driving for changing the focus control position thereby grasping the value at the current focus control position. By employing such a configuration, it becomes possible to deal with the image capturing system that is capable of specifying the focus control position in the focus driving only by relative values. Furthermore, in the case of using a focus drive instruction based on relative numerical values, it is possible to cope with an image capturing system that realizes AF by adding a focus drive apparatus to the optical lens unit.

Second Embodiment

In the first embodiment described above, in a case where distance measurement for AF is successful, focusing on a wall surface to be inspected is regarded as being successful, and image capturing is performed in the normal mode. In contrast, a second embodiment provides an example of a configuration in which even in a case where distance measurement for AF is successful, a change in a focus control position is checked and a determination is made as to whether focusing on a wall surface given as an inspection target is surely achieved. In the second embodiment, the image capturing system is configured in a similar manner as described above with reference to FIGS. 1 to 3, and thus a further description thereof is omitted and a further drawing of the configuration is not provided. Moreover, the flow of the operation of the entire system in the image capturing system according to the second embodiment is similar to that described above with reference to the flow chart shown in FIG. 6, and the flow of the image selection process is similar to that described above with reference to the flow chart shown in FIG. 9, and thus a further description and a further drawing thereof is omitted.

Figure 13:
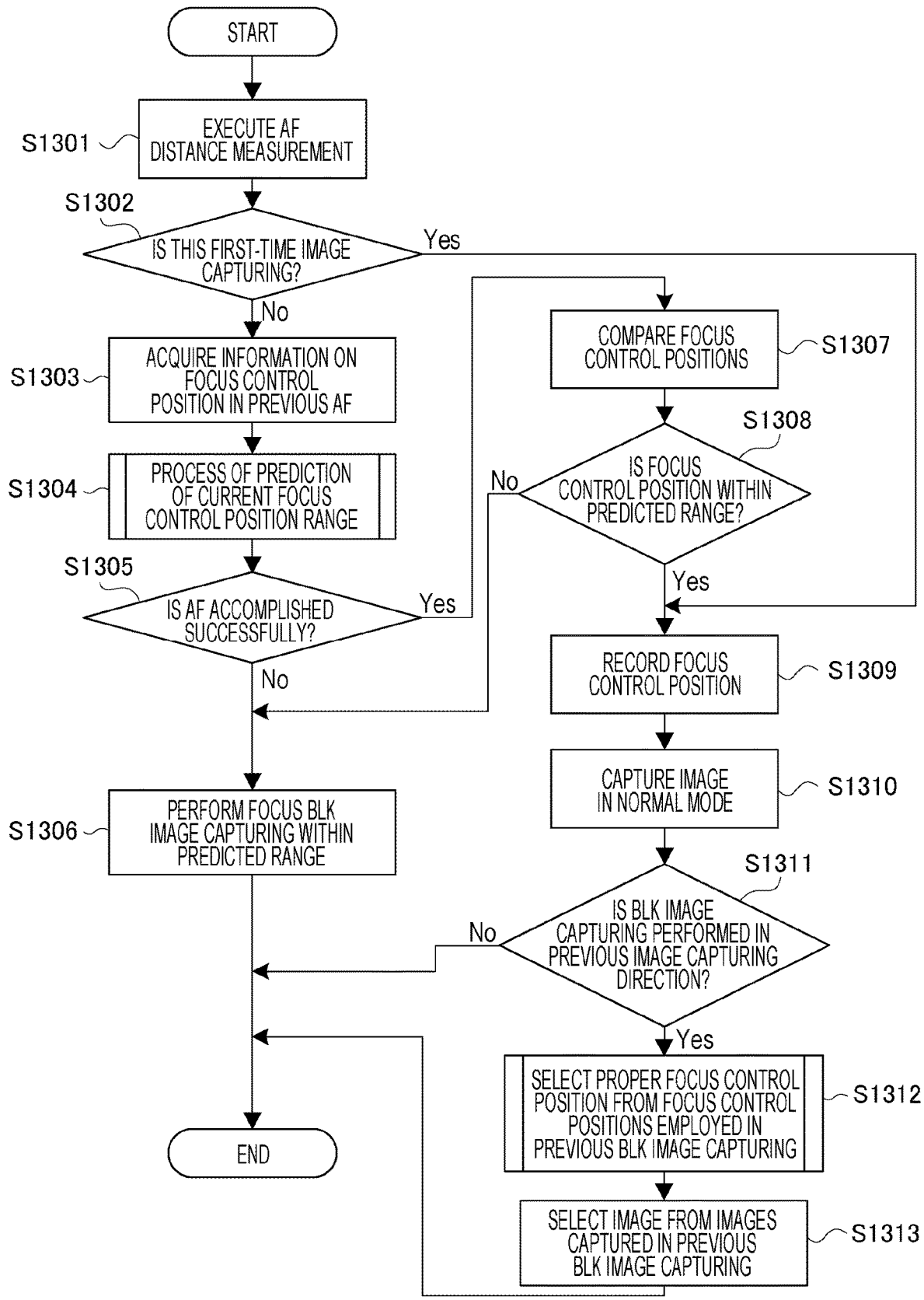
FIG. 13 is a flow chart of an image capturing process according to a second embodiment.

FIG. 13 is a flow chart illustrating an image capturing process performed by an image capturing apparatus 101 and a computational operation apparatus 103 in the image capturing system according to the second embodiment. Note that this flow chart shows details of a process in S606 shown in FIG. 6 in a case where the process is performed according to the second embodiment.

In S1301 in FIG. 13, the image capturing apparatus 101 executes a distance measurement for AF by the AF distance measurement module 305. Next, in S1302, the computational operation apparatus 103 determines whether capturing of an image by the image capturing apparatus 101 is a first-time execution of the capturing (whether a first section is subjected to the image capturing). In a case where it is determined that this is the first-time image capturing, the process by the image capturing system proceeds to S1309. On the other hand, in a case where it is determined that it is not the first-time image capturing, the process by the image capturing system proceeds to S1303.

In S1303, the computational operation apparatus 103 acquires information on a focus control position in focusing by AF in previous image capturing by the image capturing apparatus 101. Next, in S1304, the computational operation apparatus 103 predicts a range of the focus control position allowable in the current image capturing direction of the image capturing apparatus 101. Furthermore, in S1304, the computational operation apparatus 103 generates an image capturing parameter of the focus BLK image capturing within the predicted range, and sends the resultant image capturing parameter to the image capturing apparatus 101. Details of the process in S1304 will be described later. After S1304, the image capturing system advances the process to S1305.

In S1305, the image capturing apparatus 101 determines whether distance measurement performed in S701 by the AF distance measurement module 305 is successful. A result of the determination as to whether or not the distance measurement is successful is sent to the computational operation apparatus 103. In a case where it is determined that the distance measurement by the image capturing apparatus 101 is successful, the process by the image capturing system proceeds to S1307. However, in a case where it is determined that the distance measurement fails, the process by the image capturing system proceeds to S1306.

In S1306, the image capturing apparatus 101 executes the focus BLK image capturing according to the image capturing parameter of the focus BLK image capturing within the range predicted in S1304. Thereafter, the process shown in FIG. 13 by the image capturing system is ended.

On the other hand, in a case where the process has proceed to S1307, the computational operation apparatus 103 compares the focus control position based on the distance measurement acquired in S1301 with the focus control position predicted in S1304. Next, in S1308, the computational operation apparatus 103 determines, from the result of the comparison in S1307, whether or not the focus control position based on the distance measurement acquired in S1301 is within the range of the focus control position predicted in S1304. In a case where it is determined in S1308 that it is within the range, the process by the image capturing system proceeds to S1309. On the other hand, in a case where it is determined that it is out of the range, the process by the image capturing system proceeds to S1306.

In S1309, the computational operation apparatus 103 records the focus control position obtained as a result of the AF focusing by the image capturing apparatus 101. Note that in S1301, the image capturing apparatus 101 performs image capturing in the normal mode. After S1301, the process by the image capturing system proceeds to S1311.

In S1311, the computational operation apparatus 103 determines whether or not focus BLK image capturing was performed in the previous image capturing of a section. In a case where it is determined that the focus BLK image capturing was performed, the process proceeds to S1312. On the other hand, in a case where it is determined in S1311 that the focus BLK image capturing was not performed, the process in FIG. 13 in the image capturing system is ended.

In step S1312, the computational operation apparatus 103 selects an appropriate focus control position from the focus control positions used in the previous focus BLK image capturing as shown in the flow chart of FIG. 9. Next, in S1313, as in S710 shown in FIG. 7, the computational operation apparatus 103 selects a proper captured image from the images which were captured in the previous focus BLK image capturing and recorded in the image recording unit 204 of the image capturing apparatus 101. Thereafter, the process by the calculation system in FIG. 13 is ended.

Figure 14:
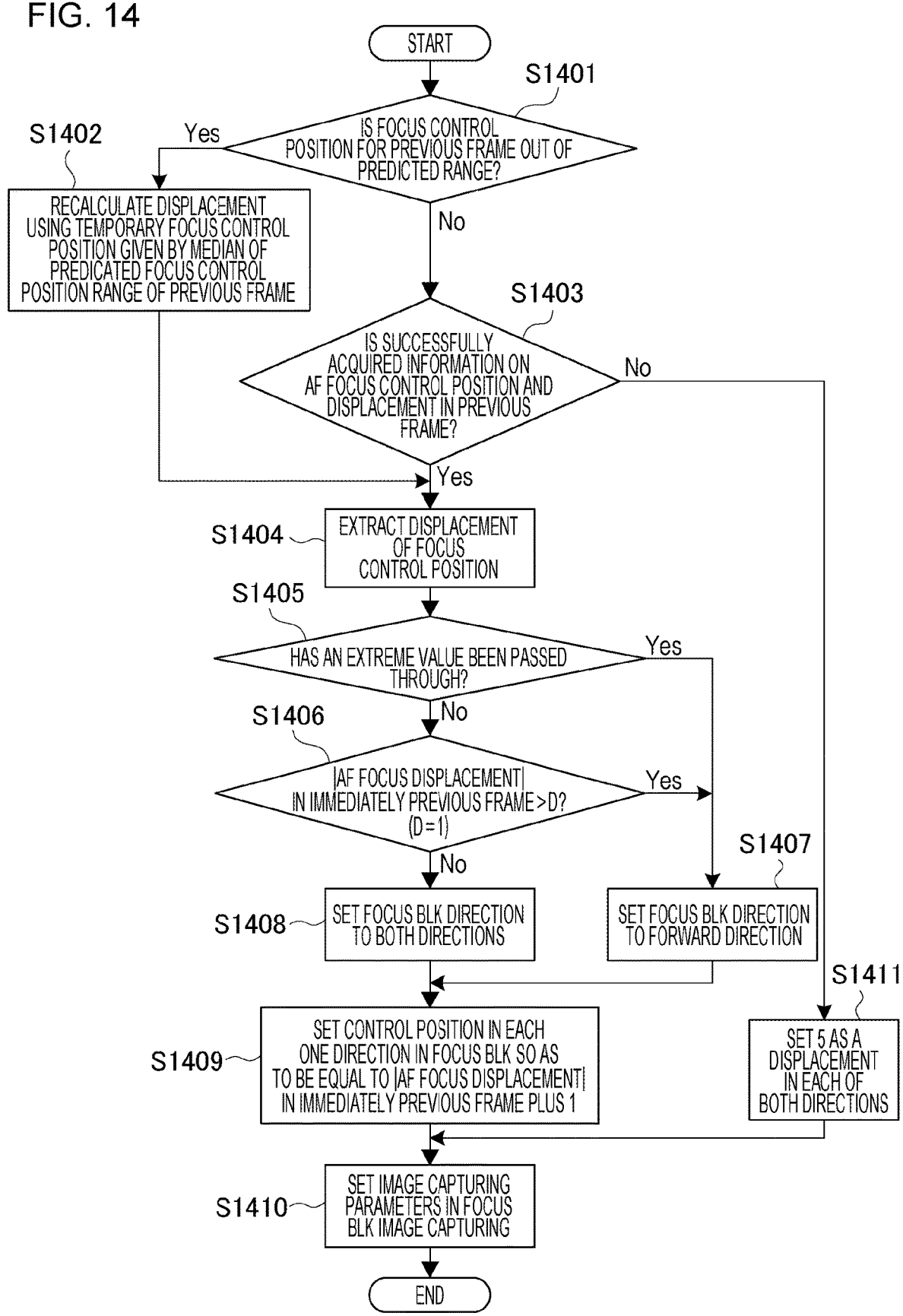
FIG. 14 is a flow chart of a prediction calculation process according to the second embodiment.

FIG. 14 is a flow chart of a process of predicting the current focus position range performed by the computational operation apparatus 103 of the image capturing system according to the second embodiment. More specifically, FIG. 8 shows details of the process in S1304 shown in FIG. 13.

In S1401 in FIG. 14, the focus range estimation unit 215 of the computational operation apparatus 103 determines whether the focus control position acquired via the distance measurement in previous section image capturing is out of the range of the focus control position predicted for this previous section image capturing. In a case where it is determined that it is out of the predicted range, the computational operation apparatus 103 advances the process to S1402. On the other hand, in a case where it is determined that it is within the prediction range, the process proceeds to S1403.

In S1402, the focus range estimation unit 215 sets the median value of the focus control positions in the predicated range as a temporary focus control position, and calculates the displacement amount of the focus control position based on the temporarily set value.

On the other hand, in a case where the process has proceeded to S1403, the focus range estimation unit 215 determines whether or not the focus control position and the displacement amount of the focus control position in the previous image capturing are acquired. In a case where the focus range estimation unit 215 determines in S1403 that the focus control position and the displacement amount are acquired, the focus range estimation unit 215 advances the process to S1411. On the other hand, in a case where it is determined that they are acquired, the focus range estimation unit 215 advances the process to S1404.

The process in S1404 is similar to that in S802 in FIG. 8, and thus a description thereof is omitted. Furthermore, S1405 is similar to S803, S1406 is similar to S804, S1407 is similar to S805, S1408 is similar to S806, S1409 is similar to S807, S1410 is similar to S808, and S1411 is similar to S809.

Figure 15:
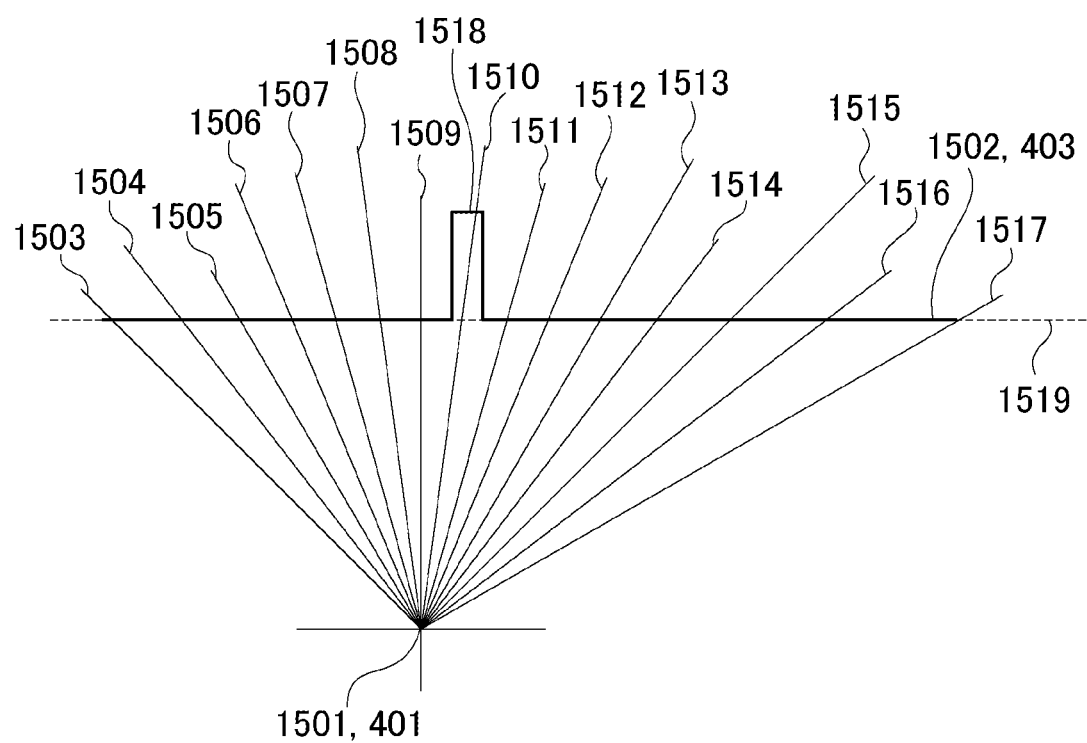
FIG. 15 is a diagram illustrating various image capturing directions according to the second embodiment.

FIG. 15 is a diagram showing respective image capturing directions in which an inspection target is captured on a section-by-section basis in the image capturing system according to the second embodiment.

In FIG. 15, as in the above-described example shown in FIG. 10, an installation position 1501 represents the installation position 401 of the camera platform apparatus 102 on which the image capturing apparatus 101 is disposed, and a wall surface 1502 represents the wall surface 403 of the building 402 to be inspected. Directions 1503, 1504, . . . , 1517 represent image capturing directions which are sequentially selected by the camera platform apparatus 102 performing an operation of pan driving and then stopping in each direction to capture an image of a section. A recessed part 1518 is a recessed part existing on the wall surface 1502 to be inspected. In FIG. 15, a dotted line 1519 on the wall surface 1502 in indicates a position of the surface to be focused as the wall surface 1502 to be inspected.

FIGS. 16A to 16E are respectively tables showing the success or failure of AF, the predicted range of the focus control position, the focus control position, the change in displacement amount of the focus control position, etc., for a case where the image capturing is performed in each direction sequentially selected from the image capturing directions 1503 to 1517 shown in FIG. 15.

In the examples shown in FIGS. 16A to 16E, as with the examples described above with reference to FIG. 11, "image capturing direction number" describes the numbers respectively assigned to the image capturing directions 1503 to 1517 shown in FIG. 15. "Success or failure of AF" indicates whether or not AF is successful in the image capturing in the direction indicated by the image capturing direction number. "Predicted F control position range" indicates the range of the focus control position predicted in S1304 in FIG. 13. "Focus control position" and "displacement amount of F control position" are the same as those in FIG. 11.

Referring to FIGS. 15 and 16, the processing flow of the flow charts shown in FIGS. 6, 13, and 14 in the imaging system of the second embodiment, and an operation of each apparatus and an operation by a user of the image capturing system are described further in a simplified and more easily understandable manner with reference to a practical time series operation.

In the second embodiment, when it is planned to perform image capturing on the wall surface 1502 given as an inspection target shown in FIG. 15 and the process shown in FIG. 6 is started in the image capturing system according to the present embodiment, the processing is performed as follows. In step S601, a user performs inputting to set the camera platform apparatus 102. In S602, preparations are made for panning the camera platform apparatus 102 from an image capturing direction 1503 to an image capturing direction 1517. Thereafter, the operations from S603 to S605 are the same as those described above, and the description thereof will be omitted. In the case of the second embodiment, in S606, the process shown in the flow chart in FIG. 13 is performed.

In S1301 in FIG. 13, the AF distance measurement unit 206 of the image capturing apparatus 101 performs distance measurement for AF on the object. As described in the first embodiment, it may be assumed that AF distance measurement is surely successful in the first-time execution of the image capturing on a section for the purpose of checking the wall surface. In next step S1302, it is determined whether the image capturing is of the first-time execution. The current image capturing is the first-time execution in a series of execution of image capturing shown in FIG. 15, and thus the process proceeds to S1309. In S1309, the focus control position (19 steps) corresponding to the result of the distance measurement in S1301 is recorded. In S1310, the image capturing in the normal mode is performed based on the focus control position described above.

Next, in S1311, it is determined whether or not focus BLK image capturing was performed in the previous image capturing. In this specific case, no previous image capturing has been performed, and thus the process in FIG. 13 is ended. Thereafter, the process proceeds to S607 in FIG. 6. In this specific situation, the image capturing is not yet completed for the entire inspection range, and thus, again in S605, the camera platform apparatus 102 is driven to pan, and, in S606, the image capturing process is performed. Next, in S1301 in FIG. 13, distance measurement for AF is performed in a new image capturing direction 1504. In S1302, this is not the first-time execution of the image capturing, and thus the process proceeds to S1303.

In S1303, information on the previous focus control position is acquired. In S1304, the range of the focus control position in the current image capturing direction 1504 is predicted.

In S1304, as shown in the flow chart in FIG. 14, it is determined in S1401 whether the focus control position in the previous image capturing direction 1503 is within the predicted range. In this case, since the prediction of the focus control position was not performed in the previous image capturing, the process proceeds to S1403.

In this case, in the image capturing in the image capturing direction 1504, as shown in FIG. 16A, "19" is acquired as the value of the focus control position in the previous image capturing, but the amount of displacement of the focus control position in the previous image capturing is not acquired. Thus the process proceeds to S1411. As a result, the predicted range of the focus control position in the image capturing direction 1504 is set such that "5" is set as the shifting amount in both directions from the focus control position of "19" employed in the previous image capturing, that is, the values "14" to "24" are set. Thereafter, in S1305 in FIG. 13, it is determined whether or not the distance measurement for AF in S1301 is successful. In this specific case, it is successful, and thus the process proceeds to S1307.

In S1307, "21" obtained as the focus control position in the image capturing direction 1504 is compared with "14" to "24" of the predicted range of the focus control position in this image capturing direction 1504. In S1308, it is determined that the focus control position is within the predicted range, and thus the process proceeds to S1309, and "21" is recorded as the focus control position in the image capturing direction 1504. In S1310, based on this focus control position, the image capturing is performed in the normal mode.

Next, in S1311, since the focus BLK was not employed in the previous image capturing, the process in FIG. 13 is ended.

When the process returns from S607 to S605 in a processing loop in FIG. 6, and the image capturing in the image capturing direction 1505 is started, then in S1301, distance measurement for AF in this image capturing direction is performed. In the determination in S1302, it is determined that this is not the first-time execution of the image capturing, and thus the process proceeds to S1303. In S1303, the focus control position in the previous image capturing is acquired.

In the flow chart of FIG. 14, which is the internal process of S1304, in S1401, it is determined whether the focus control position in the previous image capturing direction is within the predicted range. In this specific case, it is within the predicted range, and thus the process proceeds to S1403. In S1403, It is determined whether or not it is possible to acquire the focus control position and the displacement amount thereof in the image capturing direction 1504 in the previous image capturing. In this case, as shown in FIG. 16A, the acquisition is possible, and thus the process proceeds to S1404.

Thereafter, in S1404 to S1410, as in S802 to S808 in FIG. 8 according to the first embodiment, a calculation is performed based on the focus control position and the amount of displacement thereof in the previous image capturing, and "21" to "24" are set as the predicted range of the focus control position.

Next, in S1305 in FIG. 13, it is determined whether or not the distance measurement in S1301 is successful. In this specific case, it is successful, and in S1307 and S1308, the focus control position based on the distance measurement is compared with the prediction range and the comparison result is judged.

Thereafter, as in the case of the image capturing direction 1504, the focus control position is recorded in S1309, and then the image capturing is performed in the normal mode in S1310. In S1311, because the previous execution of the image capturing was performed also in the normal mode, and thus the process in FIG. 13 is ended.

Thereafter, in the processing loop from S605 to S607 in FIG. 6, the image capturing is performed repeatedly to perform image capturing in the respective image capturing directions 1506 to 1509. Thus, the image capturing is performed at focus control positions as shown in FIG. 16B.

Next, in the image capturing in the image capturing direction 1510, by performing the process in S1304 in FIG. 13, a predicted range "23" to "25" of the focus control position in the image capturing direction 1510 is calculated based on the focus control position in the image capturing direction 1509 and the displacement amount thereof in the previous image capturing. Thereafter, in S1305, although the position is off the dotted line 1519 of the wall surface 1502 given as the inspection target in FIG. 15, the distance measurement is successful for the recess 1518, and thus the process proceeds to S1307, and in S1308, a judgement is made. In this case, the focus control position based on the distance measurement in the image capturing direction 1510 is "20", and thus, as shown in FIG. 16B, it is out of the prediction range "23" to "25" obtained in S1304. As a result, the process proceeds to S1306. In S1306, the focus BLK image capturing is performed based on the focus BLK image capturing parameter previously set in S1410 in FIG. 14. Thereafter, the process in FIG. 13 is ended.

Via the loop path from S607 in FIG. 6, the image capturing in the image capturing direction 1511 is started.

In S1301 in FIG. 13, the distance measurement is performed in the image capturing direction 1511. Thereafter, the process proceeds to S1303 via S1302.

In S1303, information on the previous focus control position in the previous image capturing is acquired, and in S1304, the predicted range of the focus control position in the current image capturing is calculated.

In the flow chart of FIG. 14, which is the internal process of S1304. In S1401, it is determined whether or not the focus control position based on the distance measurement in the previous image capturing is out of the prediction range. In the image capturing in the image capturing direction 1510, it is out of range, and thus the process proceeds to S1402. In S1402, the median of the predicted range of the focus control position in the previous image capturing direction 1510 is set as the temporary focus control position in the image capturing direction 1510. Subsequently, recalculation is performed on the amount of the displacement of the focus control position. FIG. 16C shows this state. The focus control position is changed from "20" which is a value based on the distance measurement to "24" based on the calculation in S1402, and the displacement amount of the focus control position is changed from "–4" to "0".

In S1404 and thereafter, based on the changed focus control position in the previous image capturing and the displacement amount thereof, calculation of the predicted range of the focus control position in the image capturing direction 1511 is performed. As shown in FIG. 16D, values "23" to "25" are set.

Next, in S1305 in FIG. 13, because the distance measurement is successful, and the processes in S1307 and S1308 are performed. In this case, the focus control position based on the distance measurement in the image capturing direction 1511 is within the predicted range, and thus the image capturing is performed in the normal mode in S1310.

In S1311, because the focus BLK image capturing was performed in the previous image capturing, the process proceeds to S1312, and the above-described process in FIG. 9 is started. That is, as shown in FIG. 16D, in S905 and S906, "24" is selected as the value of the focus control position used in image capturing direction 1510, and in S1313, a corresponding image is selected. Thus, and the process in FIG. 13 is ended.

Thereafter, the process from S605 to S607 in FIG. 6 is repeated to perform the processes for the image capturing directions 1512 to 1517 as shown in FIG. 16E to complete the image capturing for the inspection of the wall surface image.

As described above, in the second embodiment, even in a case where distance measurement for AF is successful, a change in a focus control position is checked and the determination is made as to whether focusing on the wall surface given as the inspection target is actually achieved. Therefore, according to the second embodiment, it becomes possible to obtain a captured image with higher reliability than in the case of the first embodiment.

Other Embodiments

The present invention may also be implemented such that a program to realize one or more functions of the above-described embodiments is supplied to a system or an apparatus via a network or a storage medium, and one or more processors in a computer of the system or apparatus read and execute the program. The present invention may also be implemented by a circuit (for example, ASIC) that realizes one or more functions.

The embodiments described above are merely examples of implementations of the present invention, and it is to be understood that these examples do not limit the technical scope of the present invention. That is, the present invention may be embodied in various forms without departing from the technical philosophy or major features of the present invention.

According to the embodiments described above, the image capturing can be continued even in a situation in which AF does not work normally without making it necessary to again perform image capturing due to a failure in focusing.

The present invention is not limited to the embodiments described above, but various changes and modifications are possible without departing from the spirit and the scope of the present invention. In order to make the scope of the present invention public, the following claims are attached.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

The invention claimed is:

1. An information processing apparatus comprising:
one or more processors and one or more memories,
wherein the one or more processors, by executing a program stored in the one or memories, function as:
a control unit configured to control an image capturing unit including an optical lens unit, the image capturing unit being configured to acquire captured images such that an image capturing direction as a direction of an optical axis of the optical lens unit is sequentially moved with respect to an object given as an image capturing target so that an angle between the image capturing direction and a surface included in the object and image capturing is performed in each of moved image capturing directions, thereby acquiring an image of each section of the object while repeating movement of the image capturing direction, stopping the movement of the image capturing direction, a focusing operation by an autofocus function of the image capturing unit and the image capturing;
a recording unit configured to store a focus control position for specifying a focal length in image capturing by the image capturing unit in association with a captured image of a section of the object in a memory; and
a predicting unit configured to predict a range of a focus control position for a current section of the object corresponding to which is a current image capturing direction of the image capturing unit based on the focus control position in capturing an image of a previous section of the object corresponding to which is a previous image capturing direction of the image capturing unit where the angle between the image capturing direction and the surface included in the object is different from the current image capturing direction stored by the recording unit,
wherein the control unit controls the image capturing unit to perform focus bracketing image capturing for the current section of the object such that a plurality of images of the current section is captured while changing the focus control position within the predicted range of the focus control position for the current section of the object in a case where the focusing operation by the autofocus function of the image capturing unit is not successful, or in a case where a focus control position by the autofocus function of the image capturing unit is not within the predicted range of the focus control position.

2. The information processing apparatus according to claim 1,
wherein the control unit controls the image capturing unit to perform the focus bracketing image capturing for the current section of the object in a case where autofocus fails or in a case where it is determined that a result of autofocus of the image capturing unit is not appropriate based on comparison between the result of autofocus of the image capturing unit and the predicted range of the focus control position for the current section of the object.

3. The information processing apparatus according to claim 2, wherein
the predicting unit is configured to, in a case where a focus control position for the previous section of the object is out of a range of the focus control position for the previous section of the object set by the predicting unit, predict the range of the focus control position for the current section of the object based on the focus control position within the range.

4. The information processing apparatus according to claim 1, wherein the one or more processors further function as a selection unit configured to, in a case where focusing by an autofocus function of the image capturing unit on a next section of the object succeeds after the focus bracketing image capturing is performed on the current section, select a specific image from a plurality of captured images acquired by the focus bracketing image capturing performed on the current section based on a result of the focusing.

5. The information processing apparatus according to claim 4, wherein
the selection unit is configured to select the specific image based on the focus control position for the next section and the predicted range of the focus control position for the current section of the object.

6. The information processing apparatus according to claim 5, wherein the selection unit is configured to select an image captured from a focus control position near the focus control position for the next section as the specific image.

7. The information processing apparatus according to claim 4, wherein the one or more processors deletes an image that is not selected, by the selection unit, from the plurality of captured images acquired in the focus bracketing image capturing.

8. The information processing apparatus according to claim 1, wherein the predicting unit is configured to predict the range of the focus control position for the current section of the object based on a displacement amount of a focus control position in capturing an image of each of sections of the object.

9. The information processing apparatus according to claim 8, wherein the predicting unit is configured to set a shift direction of the focus control position for the focus bracketing image capturing in both directions with respect to a predetermined value in a case where an absolute value of the displacement amount does not exceed a threshold value, and set the shift direction of the focus control position for the focus bracketing image capturing in one direction with respect to the predetermined value in a case where the absolute value of the displacement amount exceeds a threshold value.

10. The information processing apparatus according to claim 9, wherein
the predicting unit sets a shift amount of the focus control position so as to be equal to a value based on the absolute value of the displacement amount.

11. The information processing apparatus according to claim 9, wherein the predicting unit is configured to set the shift direction in a same direction as a shift direction of the displacement amount with respect to the predetermined value in a case where the absolute value of the displacement amount passes an extreme value.

12. The information processing apparatus according to claim 9, wherein, in a case where focus control positions for the sections cannot be acquired, the predicting unit is configured to set the shift direction in both directions with respect to the predetermined value and set the range of the focus control position for the current section of the object with the shift amount of the focus control position as default.

13. An image capturing system comprising an image processing apparatus, an image capturing apparatus, and a camera platform apparatus, the image processing apparatus comprising one or more processors and one or more memories, wherein the one or more processors, by executing a program stored in the one or memories, function as:
- a control unit configured to control an image capturing unit including an optical lens unit, the image capturing unit being configured to acquire captured images such that an image capturing direction as a direction of an optical axis of the optical lens unit is sequentially moved with respect to an object given as an image capturing target so that an angle between the image capturing direction and a surface included in the object and image capturing is performed in each of moved image capturing directions thereby acquiring an image of each section of the object;
- a recording unit configured to store a focus control position for specifying a focal length in image capturing by the image capturing unit in association with a captured image of a section of the object in a memory; and
- a predicting unit configured to predict a range of a focus control position for a current section of the object corresponding to which is a current image capturing direction of the image capturing unit based on the focus control position in capturing an image of a previous section of the object corresponding to which is a previous image capturing direction of the image capturing unit where the angle between the image capturing direction and the surface included in the object is different from the current image capturing direction stored by the recording unit, wherein the control unit controls the image capturing unit to perform focus bracketing image capturing for the current section of the object such that a plurality of images of the current section is captured while changing the focus control position within the predicted range of the focus control position for the current section of the object in a case where the focusing operation by the autofocus function of the image capturing unit is not successful, or in a case where a focus control position by the autofocus function of the image capturing unit is not within the predicted range of the focus control position, wherein the image capturing apparatus comprises the image capturing unit, and wherein the camera platform apparatus comprises a moving unit configured to move the image capturing unit.

14. The image capturing system according to claim 13, wherein
the moving unit performs pan driving and tilt driving based on a predetermined setting.

15. The image capturing system according to claim 13, wherein the one or more processors further function as a selection unit configured to, in a case where focusing by an autofocus function of the image capturing unit on a next section of the object succeeds after the focus bracketing image capturing is performed on the current section, select a specific image from a plurality of captured image acquired by the focus bracketing image capturing performed on the current section based on a result of the focusing.

16. The image capturing system according to claim 15, wherein
the selection unit is configured to select the specific image based on the focus control position for the next section and the predicted range of the focus control position for the current section of the object.

17. The image capturing system according to claim 16, wherein the selection unit is configured to select an image captured from a focus control position near the focus control position for the next section as the specific image.

18. A method of controlling an image capturing system, comprising:
- sequentially moving an image capturing direction of an image capturing unit, the image capturing unit including an optical lens unit, such that an image capturing direction as a direction of an optical axis of the optical lens unit is sequentially moved with respect to an object given as an image capturing target so that an angle between the image capturing direction and a surface included in the object;
- acquiring a captured image of each section of the object by controlling the image capturing unit, having an autofocus function, so that an angle between the image capturing direction and a surface included in the object and image capturing is performed in each moved image capturing direction;
- recording a focus control position for specifying a focal length in image capturing by the image capturing unit in association with a captured image of a section of the object in a memory;
- predicting a range of a focus control position for a current section of the object corresponding to which is a current image capturing direction of the image capturing unit based on the focus control position in capturing an image of a previous section of the object corresponding to which is a previous image capturing direction of the image capturing unit where the angle between the image capturing direction and the surface included in the object is different from the current image capturing direction recorded in the memory by the recording, and
- controlling the image capturing unit to perform focus bracketing image capturing for the current section of the object such that a plurality of images of the current section is captured while changing the focus control position within the predicted range of the focus control position for the current section of the object.

19. A non-transitory storage medium storing a program for causing a computer to function as:
- a control unit configured to control an image capturing unit including an optical lens unit, the image capturing unit being configured to acquire captured images such that an image capturing direction as a direction of an optical axis of the optical lens unit is sequentially moved with respect to an object given as an image capturing target so that an angle between the image capturing direction and a surface included in the object and image capturing is performed in each of moved image capturing directions, thereby acquiring an image of each section of the object while repeating movement of the image capturing direction, stopping the movement of the image capturing direction, a focusing operation by an autofocus function of the image capturing unit and the image capturing;
- a recording unit configured to store a focus control position for specifying a focal length in image capturing by the image capturing unit in association with a captured image of a section of the object in a memory; and
- a predicting unit configured to predict a range of a focus control position for a current section of the object corresponding to which is a current image capturing direction of the image capturing unit based on the focus control position in capturing an image of a previous section of the object corresponding to which is a previous image capturing direction of the image capturing unit where the angle between the image capturing direction and the surface included in the object is different from the current image capturing direction stored by the recording unit, wherein the control unit controls the image capturing unit to perform focus bracketing image capturing for the current section of the object such that a plurality of images of the current section is captured while changing the focus control position within the predicted range of the focus control position for the current section of the object in a case where the focusing operation by the autofocus function of the image capturing unit is not successful, or in a case where a focus control position by the autofocus function of the image capturing unit is not within the predicted range of the focus control position.

\* \* \* \* \*